(12) United States Patent
Kumai

(10) Patent No.: US 8,488,070 B2
(45) Date of Patent: Jul. 16, 2013

(54) POLARIZING ELEMENT AND METHOD FOR MANUFACTURING THE SAME, PROJECTION TYPE DISPLAY, LIQUID CRYSTAL DEVICE, AND ELECTRONIC APPARATUS

(75) Inventor: Yoshitomo Kumai, Okaya (JP)

(73) Assignee: Seiko Epson Corporation (JP)

( * ) Notice: Subject to any disclaimer, the term of this patent is extended or adjusted under 35 U.S.C. 154(b) by 595 days.

(21) Appl. No.: 12/697,560

(22) Filed: Feb. 1, 2010

(65) Prior Publication Data

US 2010/0225832 A1 Sep. 9, 2010

(30) Foreign Application Priority Data

Mar. 6, 2009 (JP) ................................. 2009-054117

(51) Int. Cl.
 *G02F 1/1335* (2006.01)
(52) U.S. Cl.
 USPC .......... 349/8; 349/5; 349/96; 349/99
(58) Field of Classification Search
 USPC ............................................. 349/5, 8, 96, 99
 See application file for complete search history.

(56) References Cited

U.S. PATENT DOCUMENTS

2001/0004275 A1 * 6/2001 Umemoto et al. .............. 349/65

FOREIGN PATENT DOCUMENTS

| JP | 60-230102 | 11/1985 |
| JP | 10-332932 | 12/1998 |
| JP | 2005-106940 | 4/2005 |
| JP | 2005-517973 | 6/2005 |
| JP | 2006-003447 | 1/2006 |
| JP | 2006-3447 | 1/2006 |
| JP | 2007-148344 | 6/2007 |
| WO | 03-069381 | 8/2003 |

* cited by examiner

*Primary Examiner* — Lucy Chien
(74) *Attorney, Agent, or Firm* — Harness, Dickey & Pierce, P.L.C.

(57) ABSTRACT

A polarizing element includes a substrate with protruded threads, and metal thin wires provided on the protruded threads. Each metal thin wire includes a first thin wire provided to a first side surface of the protruded thread and a second thin wire provided to a second side surface of the protruded thread. Each first thin wire has a first volume. Each second thin wire has a second volume. Each metal thin wire has a third volume which is the sum of the first and second volumes. As a distance from one end of the substrate increases, the volume of each first thin wire decreases and the volume of each second thin wire increases so that the third volume is maintained within a predetermined range.

17 Claims, 27 Drawing Sheets

POLARIZING ELEMENT AND METHOD FOR MANUFACTURING THE SAME, PROJECTION TYPE DISPLAY, LIQUID CRYSTAL DEVICE, AND ELECTRONIC APPARATUS

RELATED APPLICATIONS

This application claims priority to Japanese Patent Application No. 2009-054117 filed Mar. 6, 2009 which is hereby expressly incorporated by reference herein in its entirety.

BACKGROUND

1. Technical Field

The present invention relates to a polarizing element, a method for manufacturing the same, a projection type display, a liquid crystal device, and electronic apparatus.

2. Related Art

A variety of electro-optical apparatuses use a liquid crystal device as a light modulation device. In widely known liquid crystal devices, a liquid crystal layer is provided between a pair of substrates opposing each other. Additionally, it is common for such a liquid crystal device to include a polarizing element inputting predetermined polarized light to the liquid crystal layer and an alignment film controlling the alignment of liquid crystal molecules when no voltage is applied.

Among known polarizing elements, there are a film polarizing element and a wire-grid polarizing element. The film polarizing element is produced by extending a resin film containing iodine or a dichroic dye in a single direction to allow molecules of iodine or the dichroic dye to be aligned in the extension direction. The wire-grid polarizing element is formed by densely laying nano-scale metal thin wires on a substrate having transparency.

The wire-grid polarizing element is made of an inorganic material. Thus, due to its excellent thermal resistance, the wire-grid polarizing element is particularly suitable for use as a thermally-resistant constituent member, such as a polarizing element for a light valve of a liquid crystal projector. Exemplary wire-grid polarizing elements are disclosed in JP-A-2007-148344, JP-A-60-230102, and JP-A-2006-3447, for example.

JP-A-2007-148344 discloses a method in which a metal material is deposited on ridges and valleys formed on a substrate from an oblique direction by evaporation or sputtering so as to use the deposited metal fine particles as metal thin wires instead of a conventional method of forming metal thin wires by etching and patterning a metal film. According to the document, the method enables appropriate metal thin wires to be formed without the disadvantages of corrosion in etching a metal material, and the formation of unwanted wire shapes due to reattaching of etched particles or the like.

In JP-A-60-230102 and JP-A-2006-3447, a conductive substance such as metal is evaporated to the protruded portions of a substrate from two directions, and the deposited metal fine particles are used as metal thin wires.

The techniques disclosed in these documents, however, have the following problems.

In JP-A-2007-148344, the metal material is deposited on the substrate on which the metal thin wires are formed by using a slant evaporation method, and preferably ion-beam sputtering, so as to form the metal thin wires, as described above. The method disclosed in JP-A-2007-148344, however, causes size variations in the formed metal thin wires because the distances from a material source of the metal material to various locations on the surface of the substrate differ. The size variations cause parameters, such as a distance between the metal thin wires and the width and height of the metal thin wires, which are closely related optical characteristics of the polarizing element, to vary. As a result, the polarizing element does not exhibit uniform optical properties as a whole.

JP-A-60-230102, and JP-A-2006-3447 do not mention a film-forming amount of the metal thin wires to be formed, and also do not consider the problem caused by the size variations in the formed metal thin wires.

SUMMARY

An advantage of the embodiments of the invention is to provide a wire-grid polarizing element in which a lowering in optical characteristics is made small, and that has uniform optical properties on an entire surface on which metal thin wires are formed, and to provide a method for manufacturing the polarizing element. Another advantage of the embodiments of the invention is to provide a liquid crystal device and an electronic apparatus provided with such a polarization element and therefore achieve high display-quality and high reliability.

According to a first aspect, a polarizing element includes: a substrate; a plurality of protruded threads provided at a side adjacent to one surface of the substrate in a substantially stripe-like shape in plan view, each of the plurality of the protruded threads having one side surface and another side surface in a short side direction thereof; a plurality of metal thin wires provided to the protruded threads along an extending direction of the protruded threads, each of the metal thin wires including a first thin wire and a second thin wire, the first thin wire being provided to the one side surface of the protruded thread, the second thin wire being provided to the other side surface of the protruded thread, the first and the second thin wires being overlapped at an upper end part of the protruded thread. In the element, a first volume of the first thin wire in the protruded thread is continuously decreased as the first thin wire is located further from one end of the substrate while a second volume of the second thin wire in the protruded thread is continuously increased as the second thin wire is located further from the one end of the substrate, and a variation of a third volume of the metal thin wire that is a sum of the first and the second volumes is within a predetermined range.

The first and second thin wires, which are formed in a manner such that the volumes are continuously changed, balance out the distributions thereof. This structure enables the metal thin wires to have small forming variations. In addition, controlling the volume of each metal thin wire to be within a predetermined variation range enables the polarizing element to have uniform optical properties as a whole.

Here, the term "metal thin wire" as used herein means one formed of a metal material or a semiconductor material.

It is preferable that the variation be within a range of ±4% from an average of the third volume.

In this range, a luminance variation of light transmitted therethrough can be reduced to an extent that viewers can not recognize it. This provides a polarizing element having appropriate optical properties.

Preferably, the first volume is linearly decreased as the first thin wire is located further from the one end of the substrate while the second volume is linearly increased as the first thin wire is located further from the one end of the substrate.

In the structure, the distribution of the first and second thin wires can be appropriately overlapped and balanced out in a surface in which the first and second thin wires are formed. This allows the metal thin wires to have small forming variations. As a result, a polarizing element having appropriate optical properties can be provided.

Preferably, the element further includes a protective film covering the protruded threads and the metal thin wires, and an air gap is formed in a region between the protruded threads adjacent to each other and between the metal thin wires adjacent to each other, and the air gap is not filled with the protective film.

Since an air gap is formed in the region between the protruded threads adjacent to each other and between the metal thin wires adjacent to each other, the region between the metal thin wires is not fully filled with the protective film. This provides a polarizing element having appropriate optical properties.

It is preferable that the protective film cover the air gap in a manner such that the protective film makes contact with the air gap at a top of the air gap.

According to this structure, the air gap formed between the metal thin wires is capable of sealing air or an atmosphere gas (or a vacuum) therein while forming the protective film. Therefore, a polarization element having excellent optical characteristics can be obtained.

It is preferable that the protective film be made of an insulation material having a light transmissive property.

According to this structure, the metal thin wires are insulated from the surroundings. Therefore, in a case where the polarization element is built in an apparatus, the wirings of the apparatus can be prevented from disadvantageously making contact with the metal thin wires. This provides an electronic device that can operate stably.

Preferably, the metal thin wires are made of a material selected from silicon, germanium, chromium, and molybdenum.

Since these materials are hardly oxidized, the polarizing element has high reliability and high durability. Particularly, if a polarizing element is used in an application under high temperature, an oxidizing reaction is enhanced in the high temperature state. Forming the metal thin wires with the above materials, however, can realize a polarizing element having high durability.

According to a second aspect, a method for manufacturing a polarizing element includes a step of depositing a metal material on a plurality of protruded threads provided at a side adjacent to one surface of a substrate in a substantially stripe-like pattern in plan view from a direction slanting with respect to the one surface so as to form a plurality of metal thin wires with metal films that are deposited on surfaces of the protruded threads and have a thin wire-like shape. In the method, the step of depositing further includes a step of depositing the metal material on one side surface of each of the protruded threads from a first direction intersecting an extending direction of the protruded threads so as to form a plurality of first thin wires, and a step of depositing the metal material on another side surface of each of the protruded threads from a second direction so as to form a plurality of second thin wires to form each metal thin wire with the first and the second thin wires, and an azimuth direction of the second direction is opposite to an azimuth direction of the first direction if the first and the second directions are projected on the one surface of the substrate.

Since the first and the second thin wires are formed in directions opposite to each other, the distributions of them balance out. As a result, forming variations of metal thin wires can be reduced. This enables the polarizing element to have appropriate optical properties.

Preferably, the method further includes a step of forming a protective film covering the peripheries of the metal thin wires, and in the step of forming the protective film, an air gap that is not filled with the protective film is formed in a region between the protruded threads adjacent to each other and between the metal thin wires adjacent to each other by a CVD method.

Since the CVD method has a characteristic that the growing speed of a film to be formed (film-forming speed) is high, a film can be quickly formed. As the forming of the protective film progresses, a space between the metal thin wires adjacent to each other becomes narrow at an extent of the thickness at which the protection film grows, making it hard for a material gas to go between the metal thin wires adjacent to each other and the protruded threads adjacent to each other. Accordingly, the reaction hardly takes place in a region between the protruded threads and between the metal thin wires since raw material gas is hardly supplied to the region while at the upper end parts of the metal thin wires, the reaction of forming the protective film easily progresses since the top ends are exposed to the raw material gas. Thus, the reaction of forming the protection film preferentially progresses at the upper end parts of the metal thin wires, and thus the protection film grows so as to narrow the space between the top parts of the metal thin wires that are adjacent.

As the protection film preferentially grows at the upper end parts of the metal thin wires, it becomes even harder for the raw material gas to go into the region. Therefore, the film-growth in the region stops and the region remains unfilled with the protective film. As a result, the air gap is formed without being filled with the protective film at an area in which the protective film hardly grows while the metal thin wires are effectively protected with the protective film. Consequently, the method enables a polarizing element exhibiting excellent optical characteristics with an air gap in a protective film to be easily manufactured.

According to a third aspect, a projection type display includes a lighting optical system emitting light; a liquid crystal light valve modulating the light; the above-described polarizing element on which the modulated light is incident; and a projection optical system projecting polarized light passed through the polarizing element on a projection surface.

Since the polarizing element having high thermal resistance is provided, thermal deterioration and oxidization deterioration accelerated by being heated can be lowered even though a high power output light source is used. The projection type display, thus, can be highly reliable and can have excellent display characteristics.

According to a fourth aspect, a liquid crystal device includes a liquid crystal layer, and a pair of substrates between which the liquid crystal layer is sandwiched. In the device, the above-described polarizing element is formed at a side adjacent to the liquid crystal layer of at least one of the pair of substrates.

This structure provides a liquid crystal device that has excellent optical characteristics and includes a polarizing element having high reliability with metal thin wires protected with a protective film.

According to a fifth aspect, an electronic apparatus includes the above-described liquid crystal device.

This structure enables the electronic apparatus including a display part or a light modulation device having a fine display quality and high reliability to be provided.

BRIEF DESCRIPTIONS OF THE DRAWINGS

The invention will be described with reference to the accompanying drawings, wherein like numbers reference like elements.

DESCRIPTION OF EXEMPLARY EMBODIMENTS

First Embodiment

Figure 1A:
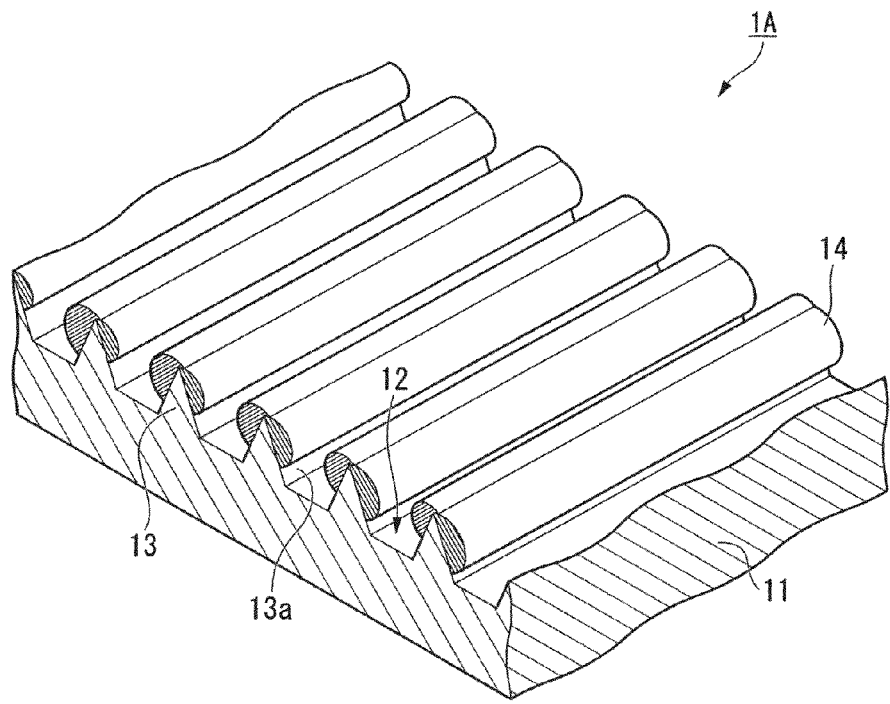
FIGS. 1A and 1B are schematic views of a polarizing element according to a first embodiment.
Figure 1B:
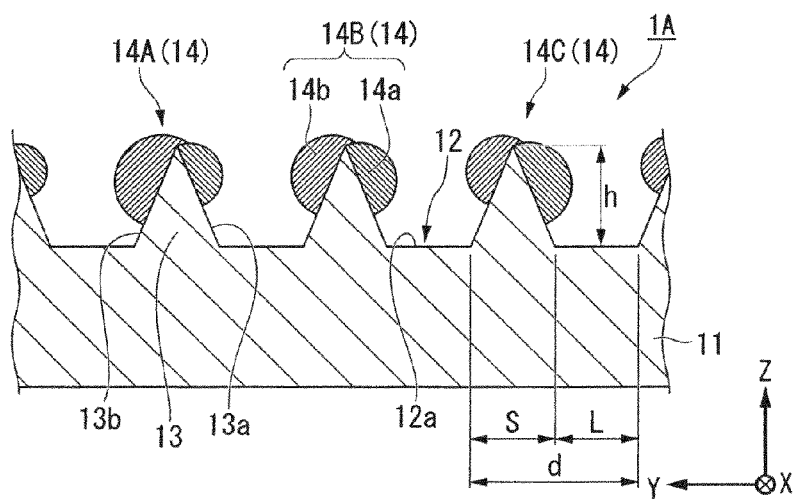

A polarizing element and a method for manufacturing a polarizing element according to a first embodiment will now be described with reference to the accompanying drawings. FIGS. 1A and 1B are schematic views of a polarizing element 1A of the first embodiment. FIG. 1A is a partial perspective view. FIG. 1B is a partial cross-sectional view of the polarizing element 1A taken along a YZ plane.

In the following descriptions, an XYZ coordinate system is established, and a positional relation of elements will be described with reference to this system. Here, a predetermined direction on a level surface is indicated as an X-axis direction; a direction perpendicular to the X-axis direction on the level surface is indicated as a Y-axis direction; and a direction perpendicular to both X-axis and Y-axis directions is indicated as a Z-axis direction. In the embodiment, an extending direction of metal thin wires is set to be in the X-axis direction, and an arrangement axis of the metal thin wires is set to be in the Y-axis direction. In the accompanying drawings, film thicknesses, scales of elements, and the like are adequately changed in the interest of clarity.

Polarizing Element

As shown in FIG. 1A, the polarizing element 1A is provided with a substrate 11, and metal thin wires 14 that are formed on the substrate 11 and extend in one direction.

The substrate 11 is made of a light-transmissive material such as glass, quartz, or plastic. The substrate 11 is preferably made of glass or quartz that has high thermal resistance because heat may be accumulated in the polarizing element 1A which may increase the temperature thereof to a high temperature in some applications of the polarizing element 1A.

The surface of the substrate 11 has a plurality of grooves 12 extending in the X-axis direction, and protruded threads 13 each extending in the X-axis direction between adjacent grooves 12. The grooves 12 are spaced apart in the Y-axis direction with a constant interval (pitch) shorter than the wavelength of visible light. The protruded threads 13 are also arranged with the same pitch.

The metal thin wires 14 are formed on the protruded threads 13 so as to straddle both side surfaces (slanted surfaces) of the protruded threads 13, and to extend in the X-axis direction, which is the same extending direction as the protruded threads 13. The metal thin wires 14 allow linear polarized light vibrating in a direction perpendicular to the extending direction of the metal thin wires 14 (i.e., in the Y-axis direction) to be transmitted therethrough while reflecting linear polarized light vibrating in the extending direction (i.e. in the X-axis direction). The metal thin wires 14 are made of a metal material such as aluminum.

As shown in FIG. 1B, each protruded thread 13 has a cross section in a triangular shape. Side surfaces 13a and 13b are formed so as to have slants tapered in a direction far from a bottom face 12a. The dimensions of the grooves 12 and the protruded threads 13 are exemplified as follows: a height h of each protruded thread 13 is 100 nm; a width L of each groove 12 is 70 nm; a width S of the bottom face 12a is 70 nm; and a pitch d is 140 nm.

Each metal thin wire 14 includes a first thin wire 14a formed on the side surface 13a (a first side surface) at one side, and a second thin wire 14b formed on the side surface 13b (a second side surface) at the other side of the protruded thread 13. The first thin wire 14a and the second thin wire 14b overlap each other at the upper end of the protruded thread 13.

In the embodiment, the comparison of the volumes of the first thin wires 14a of two metal thin wires 14 arbitrarily chosen from the plurality of metal thin wires 14 shows different values. The comparison of the volumes can be substituted for comparing the section areas of the first thin wires 14a in their short side directions. This relationship is the same in the second thin wires 14b. The metal thin wires 14 including the first and second thin wires 14a and 14b, however, have volumes approximately equal to each other. In FIG. 1B, the volumes of metal thin wires 14A, 14B, and 14C are approximately equal to each other. The volumes of the first and second thin wires 14a and 14b included in each metal thin wire, however, are different than each other. In FIG. 1B, the difference in the volumes is shown as the difference in the section areas.

Method for Manufacturing Polarizing Element

FIGS. 2A to 2E are explanatory views of a method for manufacturing the polarizing element 1A. FIGS. 2A to 2E correspond to the cross-sectional view of FIG. 1B.

Figure 2A:
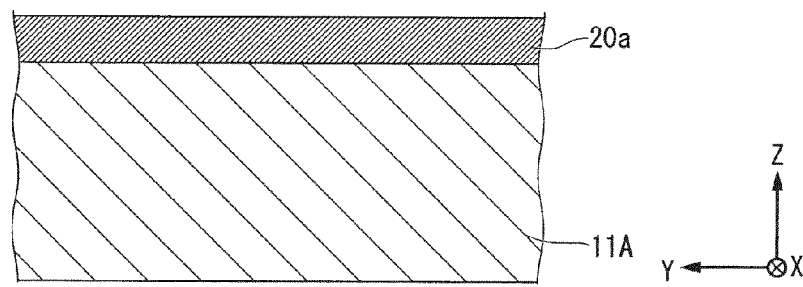
FIGS. 2A to 2E are sectional views showing manufacturing steps of the polarizing element of the first embodiment.

As shown in FIG. 2A, a substrate material 11A such as a glass substrate is prepared. Then, one surface of the substrate material 11A is coated with a resist material by spin coating. The coated material is pre-baked so as to form a resist layer 20a. As for the resist material, TDUR-P338EM (manufactured by Tokyo Ohka Kogyo Co. Ltd.) of a positive type chemical amplification resist can be used, for example. In the embodiment, the resist layer 20a is formed with a thickness of 200 nm.

Figure 2B:
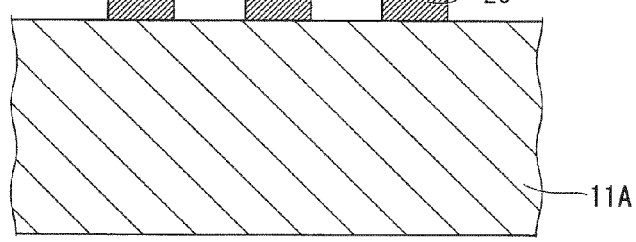

As shown in FIG. 2B, the resist layer 20a is exposed by a two-beam interference exposure method using laser light having a wavelength of 266 nm as exposure light, and then is baked (PEB). Thereafter, the resist layer 20a is developed. As a result, a resist 20 having a stripe-like pattern is formed. In the embodiment, the height of the resist 20 is 200 nm.

Figure 3:
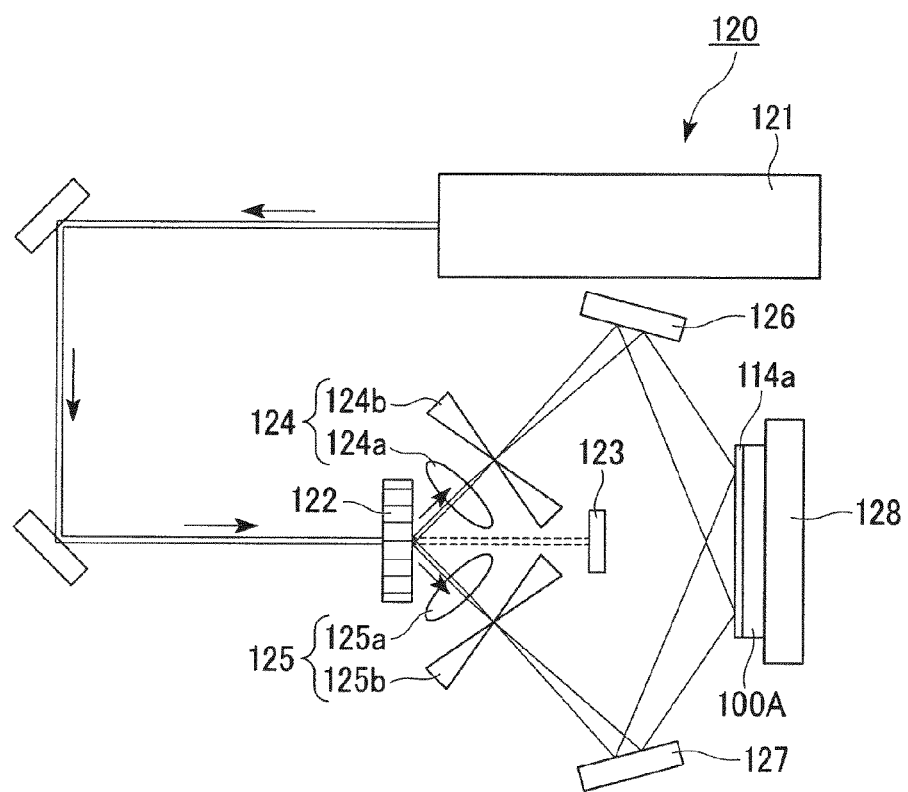
FIG. 3 is a schematic structural view illustrating an example of an exposure apparatus used for manufacturing the polarizing element.

Here, an exposure apparatus such as that shown in FIG. 3 can be used for carrying out the two-beam interference exposure method. An exposure apparatus 120 is provided with a laser light source 121 to emit exposure light, a diffraction beam splitter 122, a monitor 123, beam expanders 124 and 125, mirrors 126 and 127, and a stage 128 for supporting the substrate 11.

The laser light source 121 is an Nd:YVO4 laser device having a wavelength of a fourth harmonic wave at 266 nm, for example. The diffraction beam splitter 122 is a splitting unit for splitting a single laser beam outputted from the laser light source 121 to generate two laser beams. The diffraction beam splitter 122 generates two diffraction beams (±first order) having the same intensity as each other, if an incident laser beam is TE polarized light. The monitor 123 receives light outputted from the diffraction beam splitter 122 and converts it into an electric signal. The exposure device 120 can adjust a crossing angle of the two laser beams and the like based on the converted electric signal.

The beam expander 124 includes a lens 124a and a space filter 124b, and expands the beam diameter of one of the two laser beams split by the diffraction beam splitter 122 to, for example, approximately 300 nm. In the same manner, the beam expander 125 includes a lens 125a and a space filter 125b, and expands the beam diameter of the other of the two laser beams split by the diffraction beam splitter 122.

The mirrors 126 and 127 respectively reflect the laser beams having passed through the beam expanders 124 and 125 toward the stage 128. The mirrors 126 and 127 cross the reflected laser beams so as to generate interference light, and irradiate the resist layer 20a on the substrate 11 with the interference light.

Thus the resist layer 20a is irradiated with the interference light with the exposure apparatus 120, enabling the resist layer 20a to be exposed with light at a narrower forming pitch than the wavelength of the laser light source 121.

Figure 2C:
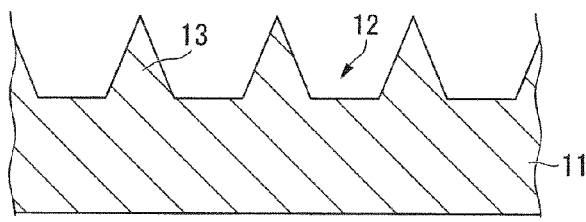

As shown in FIG. 2C, the substrate material 11A is patterned by dry-etching to a depth of approximately 50 nm to 300 nm with the resist 20. As a result, the substrate 11 is formed with the grooves 12 and the protruded threads 13. In the embodiment, the grooves 12 are etched to a depth of 100 nm. The etching is carried out using a mixed gas of $C_2F_6$, $CF_4$, and $CHF_3$ as an etching gas and with the following reaction conditions.

Gas flow rate: $C_2F_6/CF_4/CHF_3$=20/30/30 sccm.
Discharge output: 300 W
Pressure: 5 Pa
Reacting time: 30 to 40 sec.

Figure 4A:
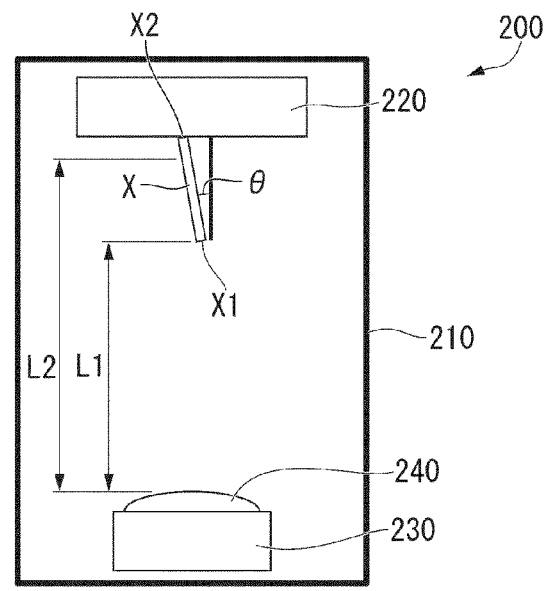
FIGS. 4A and 4B are explanatory views illustrating an example of the exposure apparatus used for manufacturing the polarizing element.
Figure 4B:
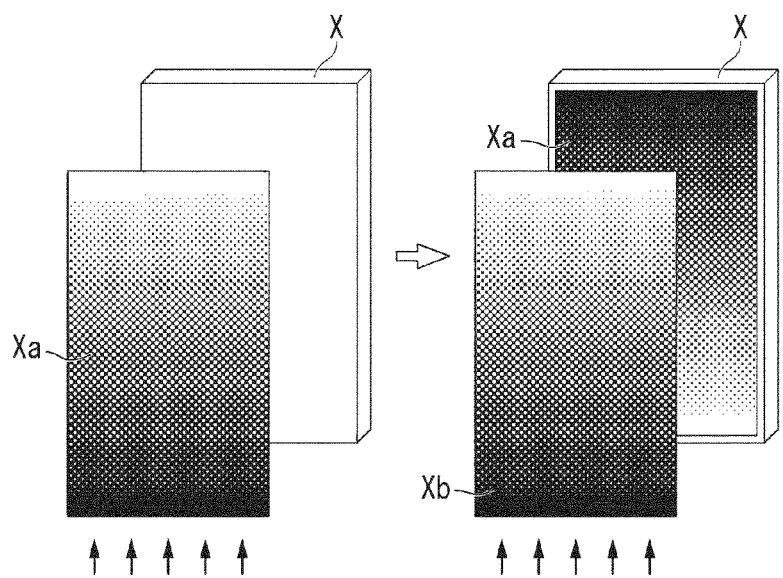

Prior to describing the formation of the metal thin wires 14 as a succeeding step, the forming method of the metal thin wires 14 is described in detail with reference to FIGS. 4A and 4B. In the related art, the formation of metal thin wires on the side surfaces of protruded threads by using known methods has a problem in that the sizes of the formed wires vary, for example. Elaborate equipment is required to form the metal thin wires without the variation, causing a problem of lowering productivity. The embodiments of the invention solve such problems by forming the metal thin wires 14 with the following method. FIGS. 4A and 4B show an evaporation apparatus used in the manufacturing method of the embodiment.

As shown in FIG. 4A, an evaporation apparatus 200 is provided with a chamber 210, a placing table 220 disposed inside the chamber 210 to hold a substrate X to be processed, a crucible 230 disposed so as to face the placing table 220, and an evaporation material 240 disposed in the crucible 230. In the evaporation apparatus 200, the substrate X is placed so as to be slanted at an angle of θ with respect to the normal line direction of the surface of the placing table 220, and evaporation is carried out. The angle θ is larger than zero degrees but equal to or smaller than 30 degrees.

The evaporation using the evaporation apparatus 200 causes a variation in the deposit amount on the surface of the substrate X because the amount of evaporated particles deposited on the surface varies depending on the distance from the evaporation material 240 to a specific location on the surface (e.g. distance shown as L1 or L2). Specifically, with the substrate X placed as shown in FIG. 4A, the deposit amounts become larger as the location of deposit becomes closer to the one-end side X1 of the substrate X, i.e. larger deposit amounts occur closer to the evaporation material 240 while smaller deposit amounts occur farther from the evaporation material 240 (closer to the other-end side X2).

Based on the above fact, the evaporation is carried out as shown in FIG. 4B. In FIG. 4B, traveling directions of evaporated particles are indicated as black arrows. Symbols Xa and Xb schematically represent deposited films formed by the evaporation. The shading of Xa and Xb shows large and small deposit amounts of the evaporated material. As the deposit amount increases, the shade deepens. As the deposit amount decreases, the shade lightens.

Thus, a deposited film Xa having a deposit amount distribution in a plane is formed on the substrate X (by evaporation from a first direction), and then the substrate X is placed upside down so as to be subjected to a second evaporation process (from a second direction). This results in the in-plane distributions of deposited films Xa and Xb being balanced out by overlapping both films. In this way, carrying out the evaporation two times separately eliminates the in-plane deposited amount variation of a metal material on the substrate X. As a result, all the metal thin wires have the same volume as each other.

Here, the volume of the formed deposited film can be expressed as a function of a distance from the evaporation material 240, and has a relation of being proportional to the distance. Consequently, carrying out the evaporation two times suitably balances the in-plane distributions of the deposited films Xa and Xb. This enables the metal thin wires to be formed without variation.

The metal thin wires 14 are formed entirely at least in a region in which the polarizing element is formed on the substrate 11. In the embodiment, aluminum is evaporated at a film forming speed of 824 nm/min. after depressurizing the inside of the chamber 210 to $6.7 \times 10^{-3}$ Pa. Any method can be employed to form the metal thin wires 14 as long as the method can form a film from a direction slanting to the surface of the substrate 11. For example, a slant evaporation method such as magnetron sputtering and ion beam sputtering can be employed.

In the embodiment, aluminum is used as a material to form the metal thin wires 14. In addition to aluminum, silicon, germanium, and molybdenum can be preferably used. Forming the metal thin wires 14 with aluminum has the advantage that it is easily processed but has a disadvantage that it may be deteriorated because it is a metal material that is easily oxidized. From this reason, it is preferable to use an oxidization resistant material such as silicon, germanium, and molybdenum for hardly deteriorating the metal thin wires 14. For example, if a polarizing element is used in an application under high temperature, an oxidizing reaction is enhanced in the high temperature state. Forming the metal thin wires 14 with the above materials, however, can realize a polarizing element having high durability. In addition, alloys dominantly including these materials may be used to form the metal thin wires if desired.

Figure 2D:
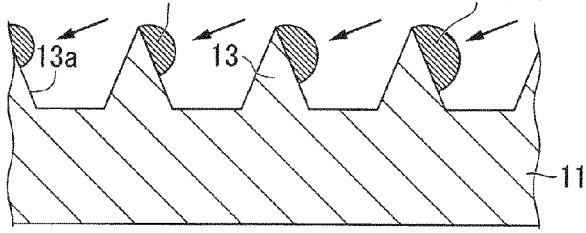

With the evaporation apparatus, as shown in FIG. 2D, the first thin wires 14a are formed on the first side surfaces 13a of the protruded threads 13. The traveling directions of the evaporated particles (a first direction D1) are indicated by arrows in FIG. 2D. As shown in FIG. 4A, the distance from the evaporation material 240 is different in locations along the surface of the substrate 11 which results in the volumes of the first thin wires 14a being dissimilar (not uniform). The larger the volume, the closer the location is to the evaporation material 240. The smaller the volume, the farther the location is to the evaporation material 240. In FIG. 2D, the first thin wire 14a indicated with Mb is, thus, larger than the first thin wire 14a indicated with Ma.

Figure 2E:
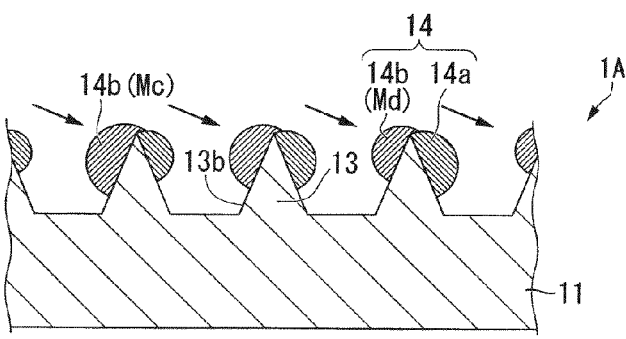

As shown in FIG. 2E, the second thin wires 14b are then formed on the second side surfaces 13b. The traveling directions of the evaporated particles (a second direction D2) are indicated by arrows in the same manner as in FIG. 2D. Like the first thin wires 14a, the second thin wires 14b are also not formed to have a uniform volume. The larger the volume, the closer the location is to the evaporation material 240. The smaller the volume, the farther the location is. In FIG. 2E, the second thin wire 14b indicated with Md is, thus, smaller than the second thin wire 14b indicated with Mc. Accordingly, the variations in forming the first thin wires 14a and the second thin wires 14b are balanced out at each of the protruded threads 13, enabling the metal thin wires 14 to each have a nearly equal volume.

As described in detail below with reference to FIGS. 5 to 12, the volume of the deposited film is proportional to the distance from the evaporation material 240.

When a material source S is deemed as a point source, a relation between the distance and a deposited amount is described below with reference to FIGS. 5 and 6.

Figure 5:
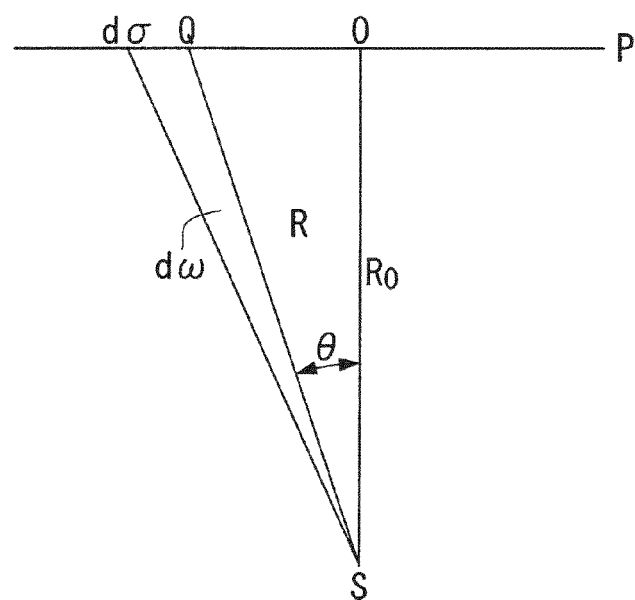
FIG. 5 is a view explaining a relation of a distance from an evaporation material and a volume of a deposited film.

The symbols shown in FIG. 5 are defined as follows: S is a material source (the evaporation material 240) of a film material; P is a surface of a substrate (the substrate X) on which a film is formed; $R_0$ is a distance from the material source S to the film-forming surface P; O is the original point of the normal line of the film-forming surface P if the material source S is disposed in the normal line direction of the film-forming surface P; dσ is a small area element at a point Q on the film-forming surface P with a distance x from the original point O; and R is a distance from the material source S to the point Q.

In this case, a solid angle dω, which is defined as the angle created in space that the small area element dσ subtends at the material source S, is expressed by the following Equation 1.

$$d\omega = d\sigma \cdot \cos\theta / R^2 \qquad \text{Equation 1}$$

In addition, m is defined as a total mass of the film material evaporated from the material source S, and dm is a mass included within the solid angle dω. The mass dm is expressed by the following Equation 2.

$$dm = m \cdot d\sigma \cdot \cos\theta / 4\pi R^2 \qquad \text{Equation 2}$$

Figure 6:
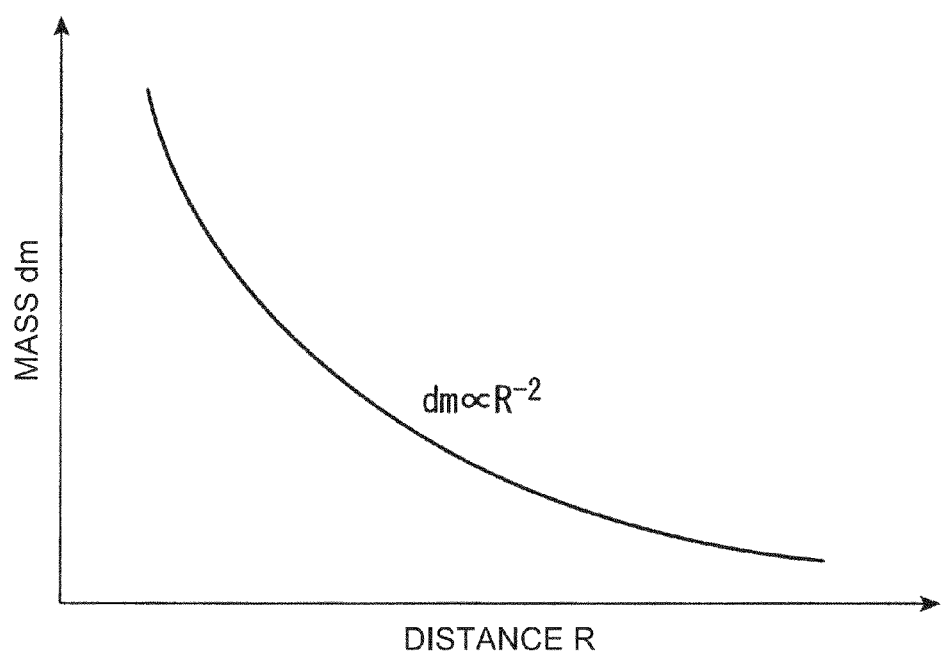
FIG. 6 is a view explaining a relation of the distance from the evaporation material and the volume of the deposited film.

That is, the mass dm is inversely proportional to the square of the distance R as shown in FIG. 6. The mass dm can be equivalently used as a film-forming amount (film thickness) or a film-forming speed. It can be said that the film-forming speed on the film-forming surface P is inversely proportional to the square of the distance R from the material source S to the film-forming surface P.

When the material source S is deemed as a small plane, the relation is described with reference to FIG. 6 taking into consideration an angle distribution in accordance with a cosine theorem.

Figure 7:
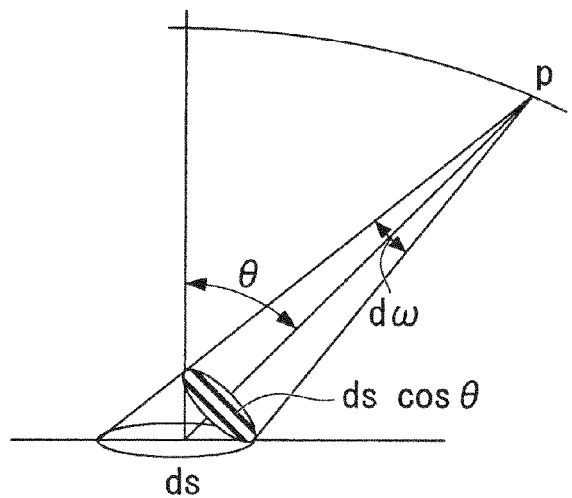
FIG. 7 is a view explaining a relation of a distance from an evaporation material and a volume of a deposited film.

In FIG. 7, p is an arbitrary point on a sphere having a large enough radius from the center of the small plane ds. The solid angle dω is the angle created in space that the small plane ds subtends at the point p. The number of molecules traveling from the small plane ds to the point p is proportional to the solid angle dω because radiation from each point on the small plane ds shows a random angle distribution.

In this case, the solid angle dω is expressed by the following Equation 3 where θ is an angle that the perpendicular line of the small plane ds makes with respect to the point p direction.

$$d\omega = ds \cdot \cos\theta / R^2 \qquad \text{Equation 3}$$

Accordingly, evaporation from the small plane ds in a direction of θ with respect to the normal line of the small plane ds is a function of cos θ. The film thickness distribution on the film-forming surface P placed in parallel with the small plane ds serving as the material source can be obtained in the same case where the material source S is deemed as the point source with an assumption that the small plane ds is placed at the position of the material source S so as to be perpendicular to the perpendicular line OS in FIG. 5.

That is, the mass dm is expressed by the following Equation 4. Practically, a film material in evaporation and a target in sputtering can be deemed as the small plane ds.

$$dm = m \cdot ds \cdot \cos\theta / \pi R^2 \qquad \text{Equation 4}$$

The mass dm is also inversely proportional to the square of the distance R in a case where the material source S is deemed as a small plane.

Figure 8:
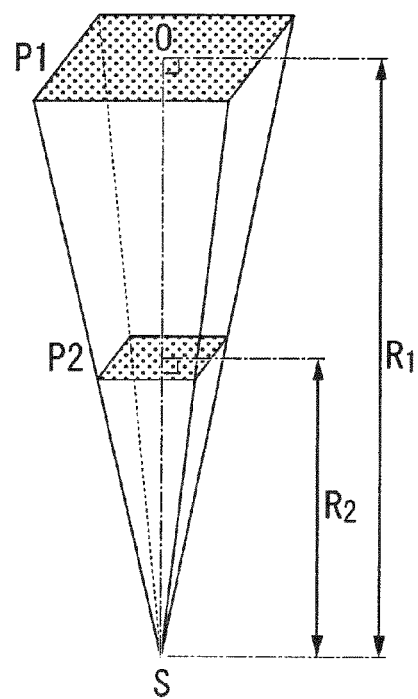
FIG. 8 is a view explaining a relation of a distance from an evaporation material and a volume of a deposited film.
Figure 9:
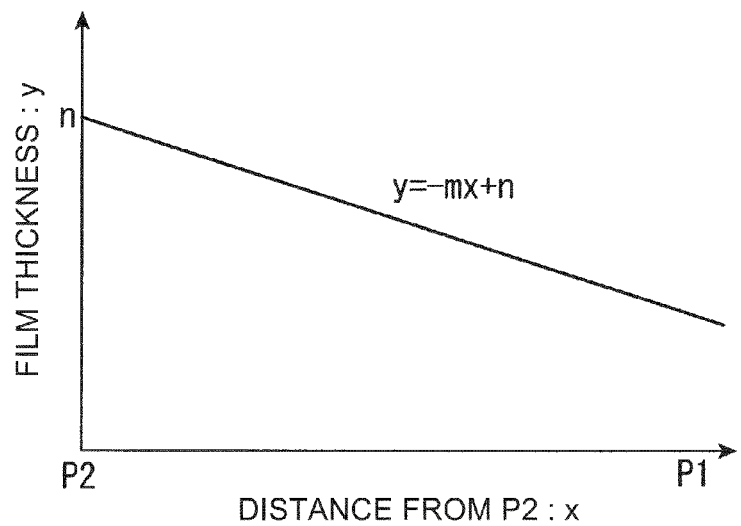
FIG. 9 is a view explaining a relation of the distance from the evaporation material and the volume of the deposited film.

With reference to FIG. 8, the film-forming amounts on film-forming surfaces P1 and P2, which are on the normal line passing through the material source S, are compared. As described above, the deposited amount is inversely proportional to the square of the distance from the material source. The film thickness distribution between the film-forming surfaces P1 and P2 after evaporation, however, can be approximated by a linear function as shown in FIG. 9 if the distance between the film-forming surfaces P1 and P2 is much smaller than a distance R1 between the material source S and the film-forming surface P1. In this case, the film-forming amount of the film-forming surface P2 closer to the material source S is larger than that of the film-forming surface P1 farther from the material source S.

For example, in a case where one surface of a silicon wafer disk having a diameter of 12 inches is deposited with $SiO_2$ as a film forming material by evaporation, the length of one side of the film-forming surface (i.e., distance from one side to the other side) is less than 10 cm as compared with the distance of 200 cm from the material source to the film-forming surface. That is, the difference in the distances from each point of the film-forming surface to the material source is much smaller than the distance from the film-forming surface to the material source. Because of this, the film thickness distribution in the film-forming surface on the substrate can be approximated by the linear function shown in FIG. 9.

Figure 10:
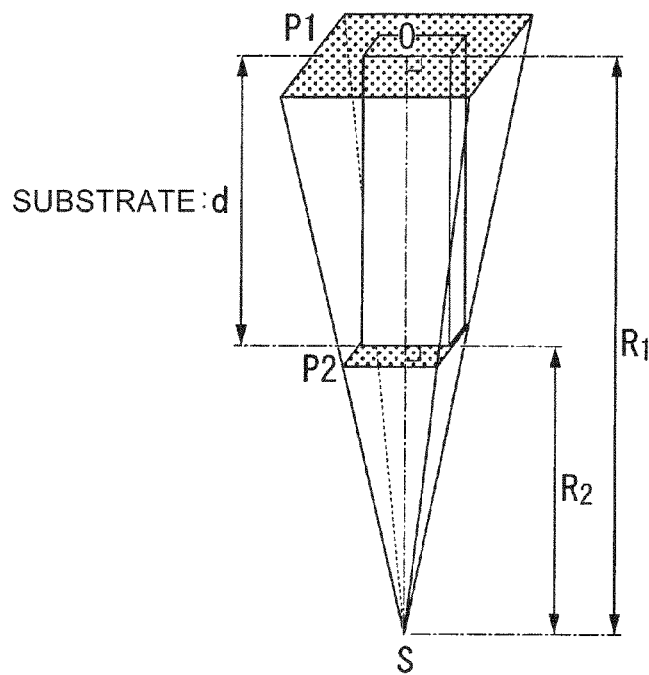
FIG. 10 is a view explaining a relation of a distance from an evaporation material and a volume of a deposited film.

When a substrate having a length of d is disposed between the film-forming surfaces P1 and P2 as shown in FIG. 10, the film thickness distribution in the film-forming surface on the substrate can be considered to show the same film thickness distribution as shown in FIG. 9.

As an assumption, a first evaporation is carried out on the film-forming surface of the substrate disposed as described above, and the resulting film thickness distribution between the film-forming surfaces P1 and P2 is shown in FIG. 9. To make the film thickness distribution uniform, a second evaporation is carried out from a second direction different from the first direction from which the first evaporation was carried out. More specifically, the second direction is preferably opposite to the first direction with reference to the film-forming surface. That is, the first and the second directions are preferably symmetrical with respect to the normal line of the film-forming surface on the substrate. The first and the second directions also preferably make the same angle with respect to the film-forming surface. If both the directions are projected on the film-forming surface, the directions preferably face one another.

Figure 11:
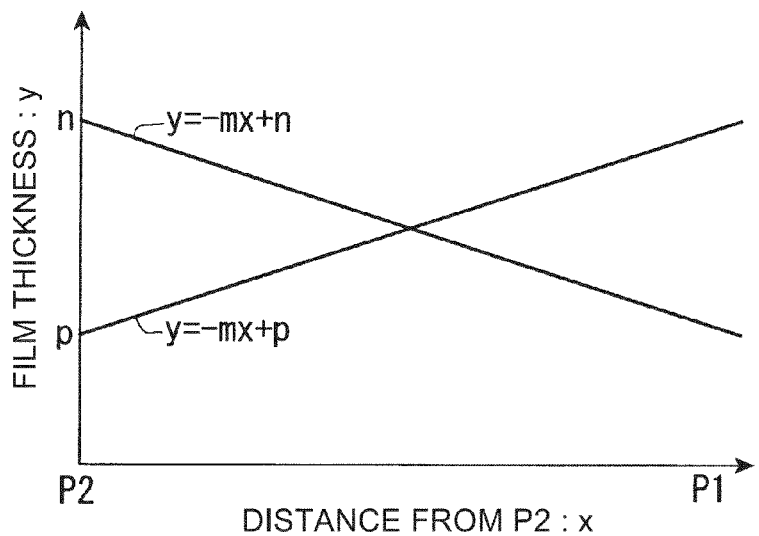
FIG. 11 is a view explaining a relation of the distance from the evaporation material and the volume of the deposited film.
Figure 12:
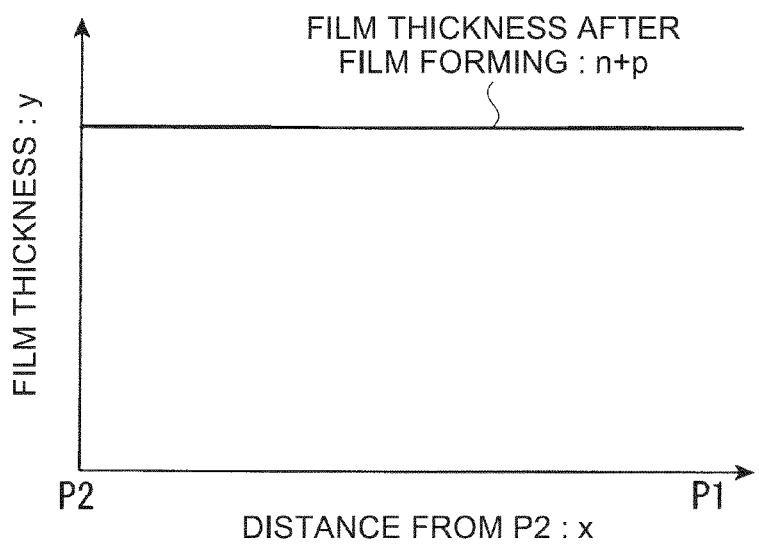
FIG. 12 is a view explaining a relation of the distance from the evaporation material and the volume of the deposited film.

As a result of the second evaporation that is carried out from the second direction different from the first direction from which the first evaporation has been carried out, and more preferably from the second direction opposite to the first direction, the film thickness distributions of the first and the second evaporations show slopes opposite to each other as shown in FIG. 11. Specifically, the film thickness distribution of the first evaporation is expressed as an approximate equation: $y=-mx+n$ while the film thickness distribution of the second evaporation is expressed as an approximate equation: $y=mx+p$. The film thickness distribution of the film formed by combining a first film formed by the first evaporation and a second film formed by the second evaporation is made uniform as shown in FIG. 12 by combining the film thickness distributions of the first and the second films.

Figure 13A:
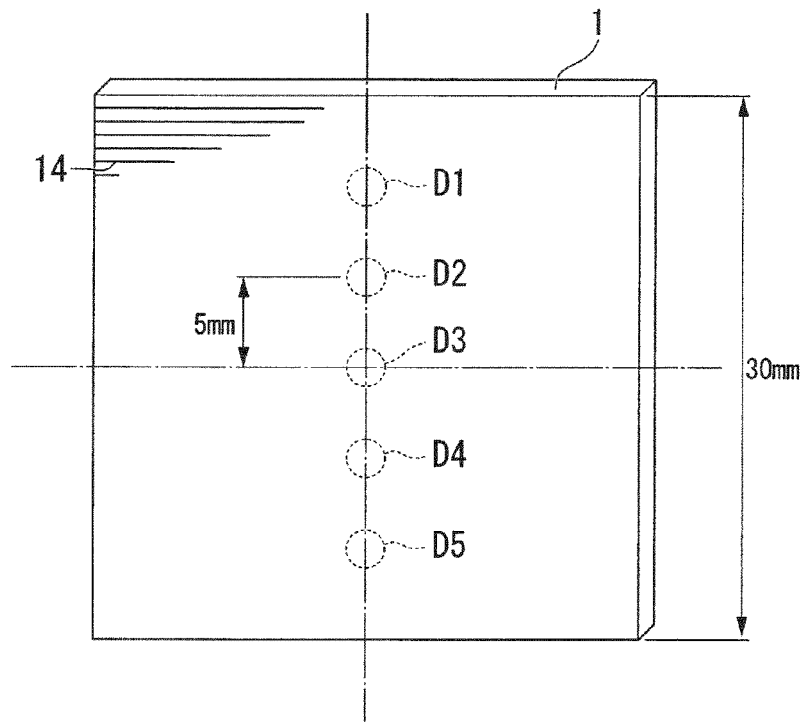
FIGS. 13A and 13B are views illustrating measurement results on the amount of the metal thin wire of the polarizing element of the first embodiment.
Figure 13B:
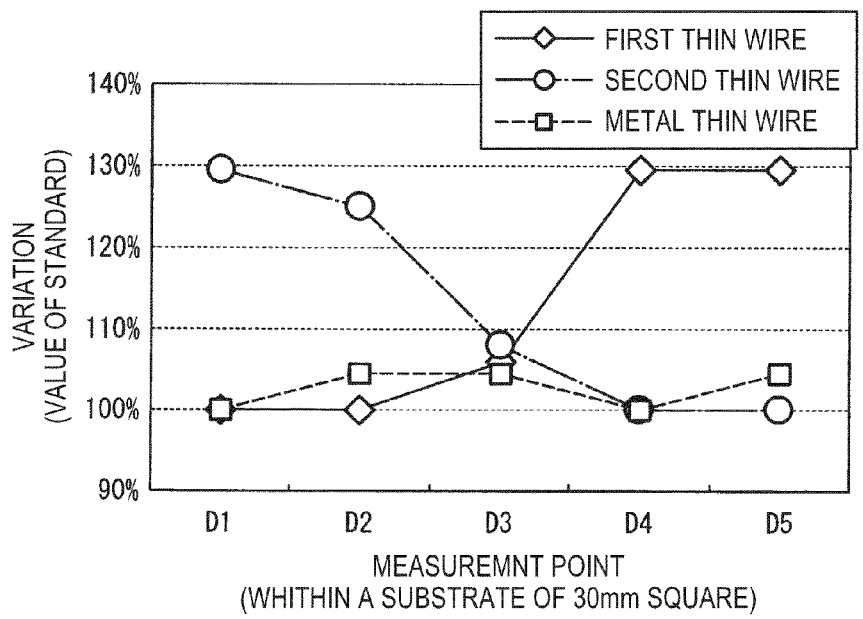

FIGS. 13A and 13B are explanatory views showing measurement results on the volumes of the metal thin wires 14 of the polarizing element 1A formed by the method shown in FIGS. 2A to 2E.

As shown in FIG. 13A, the polarizing element 1A of 30 mm square is used for the measurement. The section area is measured by using SEM at 5 points (D1 to D5) along the center axis perpendicular to the extending direction of the metal thin wires 14 to make clear the formed volume of the metal thin wire at each measurement point. The measurement point D3 is the center of the polarizing element 1A. The measurement points are spaced apart with a constant interval of 5 mm.

FIG. 13B is a graph showing the measurement results. In the graph, the abscissa axis shows the measurement points while the ordinate axis shows the variation of measured values normalized with the measured value at the measurement point D1.

In a graph showing the measurement results on the first thin wire, measured values are normalized with the measured value on the first thin wire at the measurement point D1. In a graph showing the measurement results on the second thin wire, measured values are normalized with the measured value on the second thin wire at the measurement point D5. In a graph showing the measurement results on the metal thin wire, measured values are normalized with the measured value on the metal thin wire at the measurement point D1. As can be confirmed from the measurement results, the variations (forming variations) of the first and the second thin wires are reduced in the metal thin wire composed of both thin wires. The average variations of the first and the second thin wires are approximately 23%. The variation of the metal thin wire, which is composed of both thin wires, however, is reduced to approximately 4%.

The polarizing element 1A having the structure as described above enables the metal thin wires 14 to be formed with less variation by balancing out the distributions of the first thin wires 14a and the second metal thin wires 14b that constitute the metal thin wires 14. In addition, the polarizing element 1A having uniform optical properties as a whole can be achieved by controlling the volumes of formed metal thin wire within a predetermined range in each metal thin wire.

Further, the method for manufacturing the polarizing element 1A having the structure as described above allows the distributions of the first thin wires 14a and the second thin wires 14b to be balanced out since the first thin wires 14a and the second thin wires 14b are formed from opposite directions. As a result, the forming variations of metal thin wires 14 can be reduced, thereby enabling the polarizing element 1A having appropriate optical properties to be easily manufactured.

In the embodiment, the first thin wires and the second thin wires are made of the same metal, i.e., aluminum. The first and the second thin wires, however, can be made of metal materials that are different from each other.

In the embodiment, the protruded thread 13 has a cross section of a triangle shape. The cross section, however, is not limited to a triangle shape. In addition to the shown shape, any cross sectional shape such as a rectangular shape, and a trapezoidal shape can be employed.

FIGS. 14A to 14G are explanatory views of a polarizing element 2A according to a modification, and partially correspond to FIGS. 2A to 2E. In this case, the cross section of the protruded thread 13 is an approximately rectangular shape.

Figure 14A:
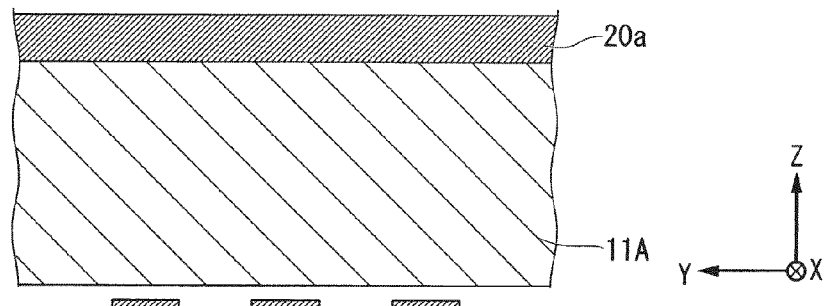
FIGS. 14A to 14E are schematic views of a polarizing element of a modification of the first embodiment.

As shown in FIG. 14A, the substrate material 11A such as a glass substrate is prepared. Then, one surface of the substrate material 11A is coated with a resist material by spin coating so as to form the resist layer 20a with a thickness of 200 nm.

Figure 14B:
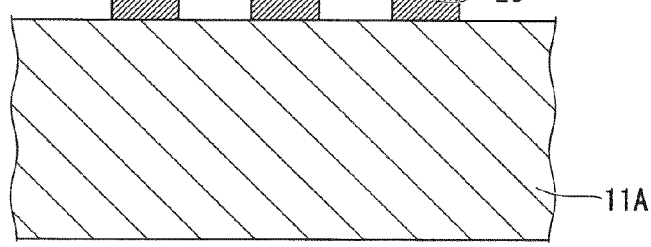

Then, as shown in FIG. 14B, the resist layer 20a is exposed by the two-beam interference exposure method. Thereafter, the exposed resist layer 20a is developed so as to form the resist 20 having a stripe-like pattern. In the embodiment, the height of the resist 20 is 200 nm.

Figure 14C:
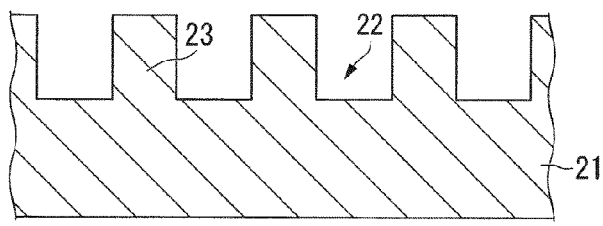

As shown in FIG. 14C, the substrate material 11A is patterned by dry-etching to a depth of approximately 100 nm to 300 nm with the resist 20. As a result, a substrate 21 having grooves 22 and protruded threads 23 is formed. The etching is carried out using a mixed gas of $C_2F_6$, $CF_4$, and $CHF_3$ as an etching gas and with the following reaction conditions.

Gas flow rate: $C_2F_6/CF_4/CHF_3$=20/30/30 sccm.
Discharge output: 300 W
Pressure: 5.0 Pa
Reacting time: 30 to 40 sec.

Figure 14D:
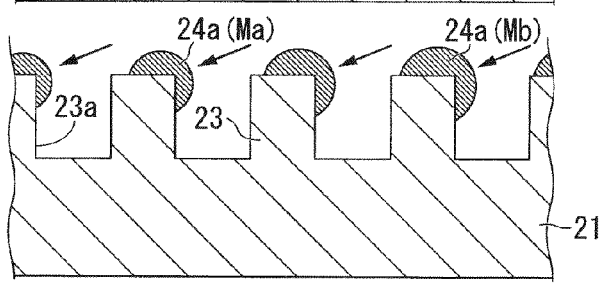
Figure 14E:
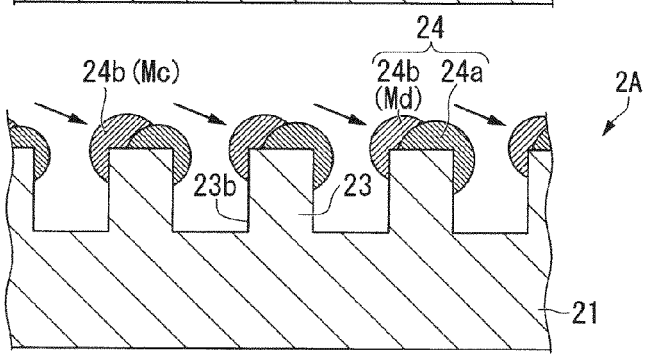

As shown in FIGS. 14D and 14E, first thin wires 24a are formed on first side surfaces 23a of the protruded threads 23, and then second thin wires 24b are formed on second side surfaces 24b in the same manner of the first embodiment. As a result, the variations in forming the first thin wires 24a and the second thin wires 24b are balanced out at each of the protruded threads 23, resulting in a plurality of metal thin wires 24 being formed.

Consequently, the polarizing element 2A of the modification is completed. A polarizing element including protruded threads having other cross sectional shapes can also be formed in the same manner as described above.

Second Embodiment

Figure 15A:
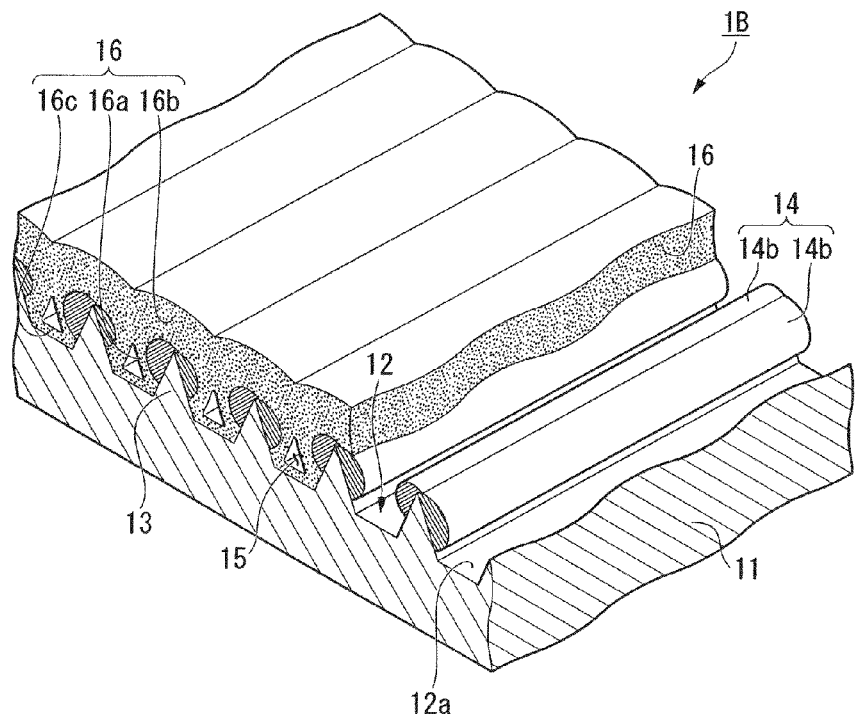
FIGS. 15A and 15B are schematic views of a polarizing element according to a second embodiment.
Figure 15B:
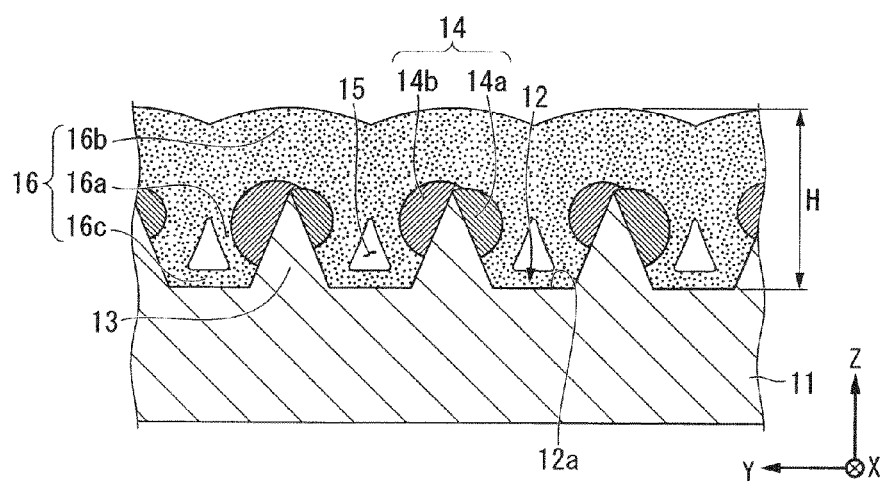

FIGS. 15A and 15B are explanatory views of a polarizing element 1B according to a second embodiment. The polarizing element 1B of the second embodiment is partially in common with the polarizing element 1A of the first embodiment. The polarizing element 1B differs in that a protective film covers the surfaces of the metal thin wires 14 of the polarizing element 1A. Therefore, in the second embodiment, components that are common with those of the first embodiment will be affixed with the same numerals, and detailed descriptions thereof will be omitted.

As shown in FIG. 15A, the polarizing element 1B has a protective film 16 covering the surfaces of the metal thin wires 14 and the substrate 11. The protective film 16 is a light transmissive insulation film such as a silicon oxide film. The protective film 16 includes a first protective film 16a, a second protective film 16b, and a third protective film 16c. The first protective film 16a covers both side surfaces of the protruded thread 13 and the metal thin wire 14, and extends in the X-axis direction. The second protective film 16b covers the top part of the metal thin wire 14 and extends in the X-axis direction. The third protective film 16c covers a bottom face 12a of the groove 12 and extends in the X-axis direction.

A plurality of second protective films 16b contact with each other in the Y-axis direction, and thus the second protective films 16b cover the entire upper surfaces of the metal thin wires 14 in an integrated manner. A space surrounded by the first protective film 16a, the second protective film 16b, and the third protective film 16c is an air gap 15. The air gap 15 is vacuumed or is filled with air or a raw material gas produced in forming the protective film 16. The surface on the side of the second protective film 16b opposite the substrate 11 mimics a pattern of the metal thin wires 14, so that a part planarly overlapping with the metal thin wires 14 is raised and a part planarly overlapping with the air gap 15 is fallen, whereby the surface is slightly undulating.

As shown in FIG. 15B, a height H is, for example, 200 nm from the bottom face 12a to the upper surface of the second protective film 16b (upper surface of the protective film 16). While the second protective films 16b that are adjacent to each other are connected in the embodiment, the second protective films 16b are not necessarily connected with each other. A small gap may be formed between the second protective films 16b, for example. In this case, the protective film 16 is formed on each of the metal thin wires 14. Accordingly, the protective film 16 extending in the X-axis direction are arranged in plural numbers in the Y-axis direction at a constant interval.

The thickness of the first protective film 16a (the thickness in the Y-axis direction) is set so that a first protective film 16a and an adjacent first protective film 16a do not contact with each other in the Y-axis direction (i.e., the air gap 15 is formed between the first protective films 16a). In addition, the width of the second protective film 16b in the Y-axis direction is larger than the sum width of the first protective film 16a, the protruded thread 13, and the metal thin wire 14 in the Y-axis direction. Further, the third protective film 16c is integrally formed with the first protective film 16a and the second protective film 16b. The space surrounded by the first protective film 16a, the second protective film 16b, and the third protective film 16c defines the air gap 15.

FIGS. 16A to 16D are explanatory views of a method for manufacturing the polarizing element 1B. The manufacturing steps of the polarizing element 1B of the embodiment are in common with the steps up to the step of forming the metal thin wires 14 in the manufacturing steps of the first embodiment. Thus, the step of forming the protective film 16 is described below. FIGS. 16A to 16D correspond to FIGS. 2A to 2E.

The protective film is formed on the metal thin wires 14 by CVD as shown in FIGS. 16A to 16D. In addition to the CVD method, examples of forming the protective film 16 may include evaporation and sputtering. However, in evaporation, an ejecting angle from a position where a film material is placed in an apparatus used for the evaporation to a forming-surface of the protective film varies depending on a location on the forming-surface. Thus a distance between the film material and the forming-surface is not constant in a precise sense. This causes a difference in the thicknesses of the protective film to be formed, resulting in a varied quality of the polarizing element. Further, in sputtering, the film-forming speed may be too low, and may not be able to achieve a desired film-forming speed. Accordingly, CVD is preferred.

Figure 16A:
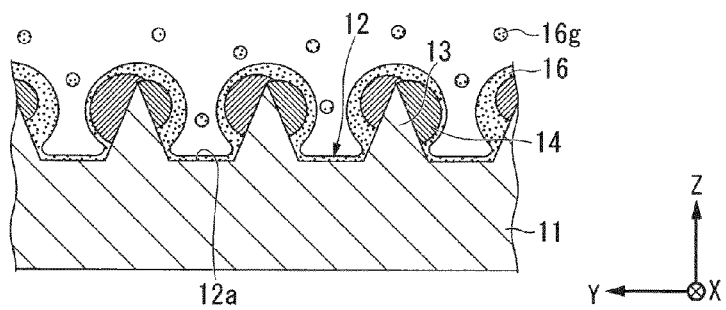
FIGS. 16A to 16D are sectional views showing manufacturing steps of the polarizing element of the second embodiment.

As shown in FIG. 16A, the substrate 11 provided with the metal thin wires 14 is placed under the working environment of the CVD method and a raw material gas 16g for the protective film 16 is supplied. The raw material gas 16g is fully supplied to the bottom face 12a to form the protective film 16. In the embodiment, silicon oxide is formed as the protective film 16, and a mixture gas of tetraethoxysilane (TEOS) and oxygen ($O_2$) is used as the raw material gas 16g. In FIG. 16A, TEOS and $O_2$ are not separately depicted but both gases are shown as the raw material gas 16g.

In addition to silicon oxide, an insulative material such as silicon nitride (SiN), silicon nitrogen oxide (SiON), and alumina ($Al_2O_3$) can be used as the material to form the protective film 16. The raw material gas 16g can be appropriately selected corresponding to the protective film 16 that is selected. Examples of the CVD method include, a thermal CVD method and a plasma CVD method. The embodiment employs the plasma CVD method. The embodiment employs the following reaction conditions.

Gas flow rate: TEOS/$O_2$=12/388 sccm.
Output: 400 W
Pressure: 40 Pa
Reaction temperature: 110° C.
Reaction time: 2 minutes As shown in FIG. 16A, as the reaction of the raw material gas 16g progresses, the protective film 16 produced by the chemical reaction is deposited on the surfaces of metal thin wires 14 and the substrate 11. The film-forming speed of the protective film 16 is, for example, 100 nm/min. In the early stage of the film-forming, the protective film 16 is deposited on the surfaces of the bottom faces 12a and the protruded threads 13, and the peripheries of the metal thin wires 14. As the reaction further progresses, the protective film 16 grows so as to wrap around the metal thin wires 14. A distance between the protective films 16 formed on the peripheries of the metal thin wires 14 adjacent to each other is gradually reduced by the grown thickness of the protective film 16.

Figure 16B:
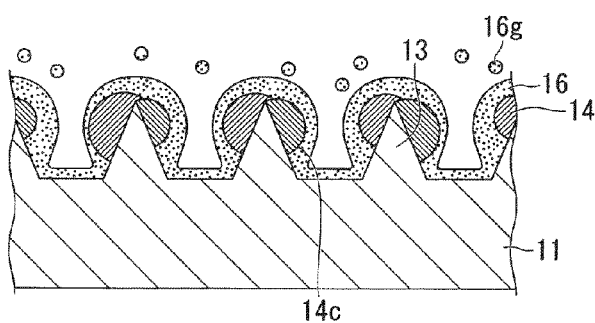

As shown in FIG. 16B, as the reaction further progresses, the distance between the metal thin wires 14 adjacent to each other is further reduced by the grown thickness of the protective film 16. As a result, it becomes harder for the material gas 16g to enter the grooves 12. Therefore, the raw material gas 16g reacts continuously at the protective films 16 formed on metal thin wires 14 before the raw material gas 16g enters the grooves 12, so that the formation of the protection film 16 preferentially progresses on the metal thin wires 14.

If the reaction speed is slow, there is sufficient time for the raw material gas 16g to be supplied to the grooves 12 even though the distance between the metal thin wires 14 is reduced by the thickness of the protective film 16. The reaction, thus, progresses on the entire surface without the protective film 16 being preferentially formed on the metal thin wires 14. Accordingly, the grooves 12 are gradually filled with the protective film 16. The structure in which the grooves 12 are filled as described above is not preferable from an optical characteristics point of view. Therefore, the grooves 12 are filled at a faster reaction speed in the embodiment.

The metal thin wire 14 is formed so as to extend toward the Y-axis direction from both side surfaces of the protruded thread 13 like eaves. Since the metal thin wire 14 has such a shape, in order to deposit the protective film 16 around a lower end portion denoted with the numeral 14c of the metal thin wire 14, the raw material gas 16g is supplied inside the groove 12 and under the eaves of the metal thin wire 14 to reach the lower end portion 14c. That is, the metal thin wire 14 has a structure in which the protective film 16 is hardly deposited on the lower end portion 14c. Some reaction conditions may allow the metal thin wire 14 to be exposed to the air gap 15 at the lower end portion 14c.

Figure 16C:
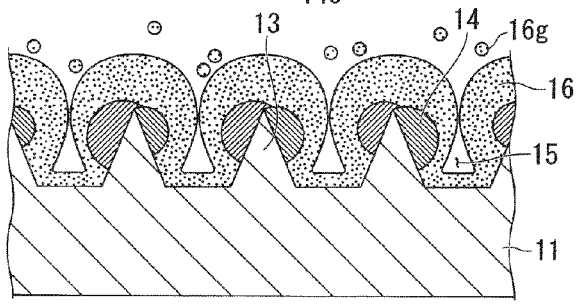

As shown in FIG. 16C, as a result of the further progress of the reaction, the protection films 16 continuing to grow on the metal thin wires 14 adjacent to each other make contact with each other. Accordingly, the air gap 15 surrounded by the protective films 16 is formed between the metal thin wires 14 adjacent to each other.

Figure 16D:
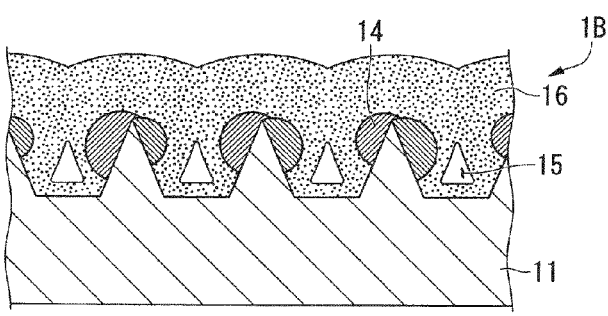

As shown in FIG. 16D, as the reaction further progresses, the front face of the protective film 16 is gradually formed to be a flat. As a result, the protective film 16 is formed to be a thick film. Consequently, the polarizing element 1B of the embodiment is completed.

In the polarizing element 1B structured as described above, the metal thin wires 14 are prevented from being oxidized since they are protected with the protective film 16, and the air gaps 15 are formed in regions each between the protruded threads 13 and between the metal thin wires 14. This structure enables the polarizing element 1B to have high reliability and excellent optical characteristics.

In the embodiment, the second protective films 16b provided on the top parts of the metal thin wires 14 adjacent to each other make contact with each other in a direction parallel with the arrangement axis direction. Because of this structure, the air gap 15 that can be filled with air or an atmosphere gas (or be vacuumed) in a forming step is formed between the metal thin wires 14, enabling the polarizing element 1B to have excellent optical characteristics.

In the embodiment, the protective film 16 is made of a light transmissive insulation material. Since the metal thin wires 14 are covered by the insulation material so as to be insulated from a surrounding area, the metal thin wires 14 are not conductive with wiring lines of a device in a case where the polarizing element 1B is built into the device, for example.

The method for manufacturing the polarizing element 1B structured as described above uses CVD to form the protective film 16 for preventing the metal thin wires 14 from being oxidized or damaged. The CVD method has a fast film-forming speed. This feature results in the film-forming reaction taking place before the raw material gas 16g is fully supplied to the air gaps 15 as the film-forming progresses. The protective film 16, thus, preferentially grows on the upper end parts of the metal thin wires 14. Finally, the film growth between the metal thin wires 14 is stopped without the gap between the metal thin wires 14 being filled with the protective film 16. This makes it possible to easily manufacture the polarizing element 1B with excellent optical characteristics.

While the metal thin wires 14 are protected with the protective film 16 alone in the embodiment, a plurality of deposited layers may be additionally formed on the protective film 16.

The cross section shape of the protruded thread 13 is not limited to a triangle shape. Any cross sectional shape such as a rectangular shape and a trapezoid shape can be employed in the same manner as in the first embodiment.

Figure 17:
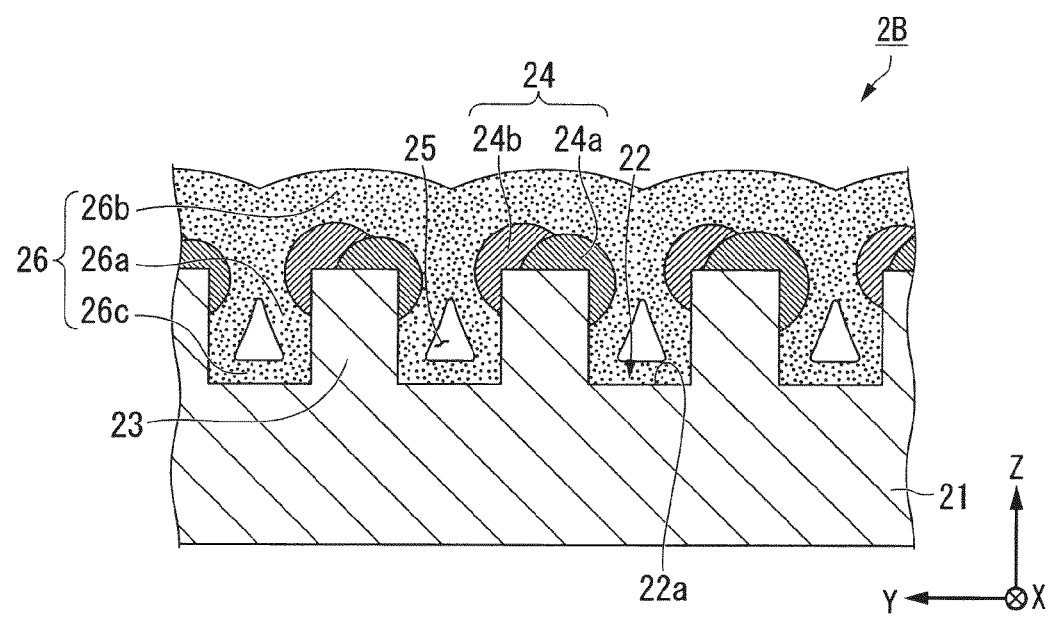
FIG. 17 is a schematic view of a polarizing element of a modification of the second embodiment.

FIG. 17 is an explanatory view of a polarizing element 2B according to a modification of the embodiment, and corresponds to FIG. 15B.

As shown in FIG. 17, the polarizing element 2B is provided with a protective film 26 that covers the surfaces of a substrate 21 and metal thin wires 24, and made of a light transmissive insulation material. The protective film 26 includes a first protective film 26a covering both side surfaces of a protruded thread 23 and the metal thin wire 24, a second protective film 26b covering the top part of the metal thin wire 24, and a third protective film 26c covering a bottom face 22a of a groove 22. A space surrounded by the first protective film 26a, the second protective film 26b, and the third protective film 26c is an air gap 25. The air gap 25 is vacuumed or is filled with air or a raw material gas in forming the protective film 26.

The polarizing element 2B is achieved by forming the protective film 26 on the surface of the polarizing element 2A, which is the modification of the first embodiment shown in FIGS. 14A to 14E, with the same method shown in FIGS. 16A to 16D.

The polarizing element 2B structured as described above has high reliability and excellent optical characteristics.

Projection Type Display

Figure 18:
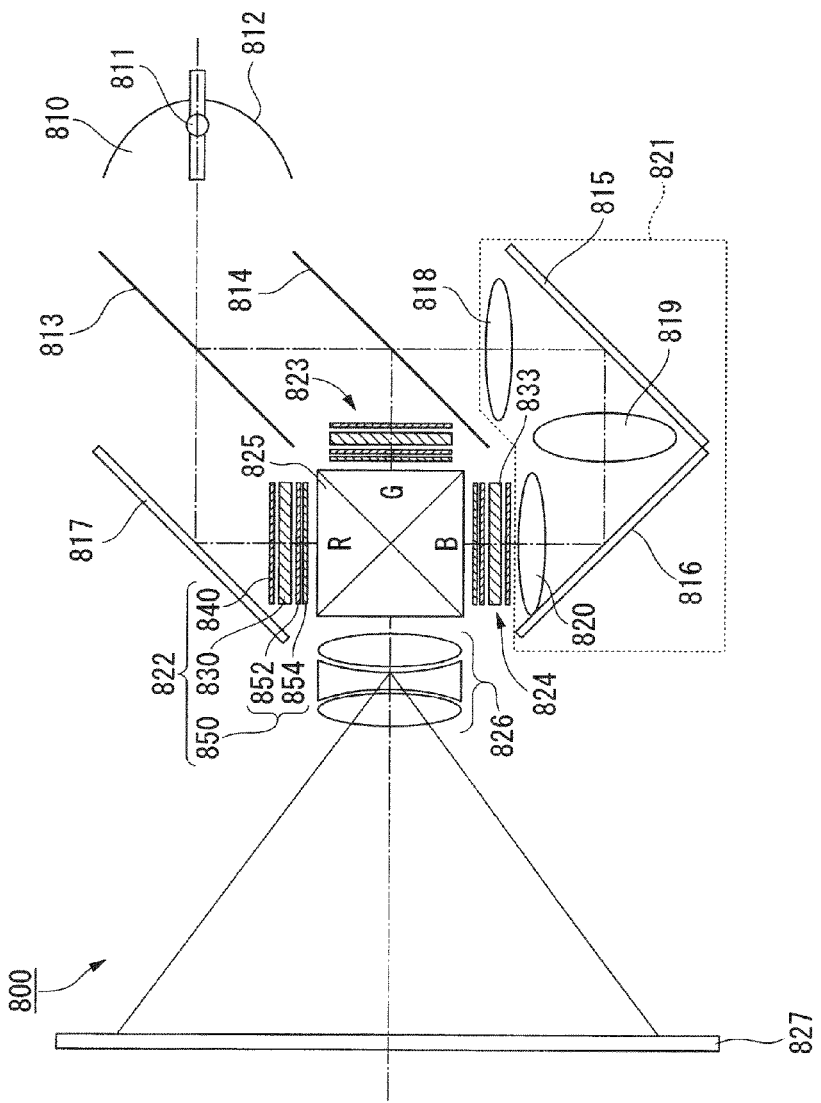
FIG. 18 is a schematic view of a projector, which is an example of electronic apparatuses.

An electronic device according to a third embodiment will be described. A projector 800 shown in FIG. 18 includes a light source 810, dichroic mirrors 813 and 814, reflection mirrors 815, 816, and 817, an incident lens 818, a relay lens 819, an output lens 820, light modulation sections 822, 823, and 824, a cross dichroic prism 825, and a projection lens 826.

The light source 810 includes a lamp 811 such as a metal halide lamp, and a reflector 812 reflecting light of the lamp. As the light source 810, an ultra-high-pressure mercury lamp, a flash mercury lamp, a high-pressure mercury lamp, a deep UV lamp, a xenon lamp, a xenon flash lamp, or the like can be used in addition to the metal halide lamp.

The dichroic mirror 813 transmits red light included in white light coming from the light source 810, and reflects blue light and green light. The transmitted red light is reflected by the reflection mirror 817 to be inputted to the light modulation section 822 for red light. Of the blue light and the green light reflected by the dichotic mirror 813, the green light is reflected by the dichotic mirror 814 and inputted to the light modulation section 823 for green light. The blue light is transmitted through the dichroic mirror 814 and inputted to the light modulation section 824 through a relay optical system 821 that includes the incident lens 818, the relay lens 819 and the output lens 820 and is provided to prevent optical loss due to a long optical path.

In each of the light modulation sections 822, 823, and 824, on opposite sides of a liquid crystal light valve 830 are disposed an input polarizing element 840 and an output polarizing element section 850 so as to sandwich the light valve 830. The input polarizing element 840 and the output polarizing element section 850 are disposed in a manner such that the transmission axes of them intersect with each other (cross-Nicol arrangement).

The input polarizing element 840 is one of a reflection type, and reflects light vibrating in a direction orthogonal to the transmission axis.

The output polarizing element section 850 includes a first polarizing element (a pre-polarization plate or a pre-polarizer) 852 and a second polarizing element 854. As the first polarizing element 852, the polarizing element of the second embodiment, which is provided with the protective film and has high thermal resistance, is used. The second polarizing element 854 is a polarizing element made of an organic material. In the output polarizing element section 850, the polarizing elements 852 and 854 are both a light-absorbing polarizing element and work together to absorb light. The polarizing element of the first embodiment may be used as the first polarizing element 852.

In general, such a light-absorbing polarizing element made of an organic material tends to deteriorate due to heat and thus it is hard to use it as a polarization unit for a large power output projector requiring a high level of luminance. However, in the projector 800, the first polarizing element 852 made of an inorganic material having high thermal resistance is disposed between the second polarizing element 854 and the liquid crystal light valve 830, and the polarizing elements 852 and 854 cooperate to absorb light. Because of this structure, deterioration of the second polarizing element 854 made of an organic material can be suppressed.

The three color light beams modulated by the respective light modulation sections 822, 823, and 824 are inputted to the cross dichroic prism 825. The cross dichroic prism 825 is formed by bonding together four square prisms. On interfaces of the square prisms are formed a dielectric multilayer film reflecting red light and a dielectric multilayer film reflecting blue light in an X-letter shape. The three color light beams are synthesized by the dielectric multilayer films to produce light representing color images. The synthesized light is projected on a screen 827 by the projection lens 826 serving as a projection optical system, whereby color images are enlarged to be displayed.

In the projector 800 thus structured, the output polarizing element section 850 includes the polarizing element of the embodiment described above, so that deterioration of the polarizing element can be suppressed even though a high power output light source is used. Accordingly, the projector 800 can be highly reliable and can have excellent display characteristics.

Liquid Crystal Device

Figure 19:
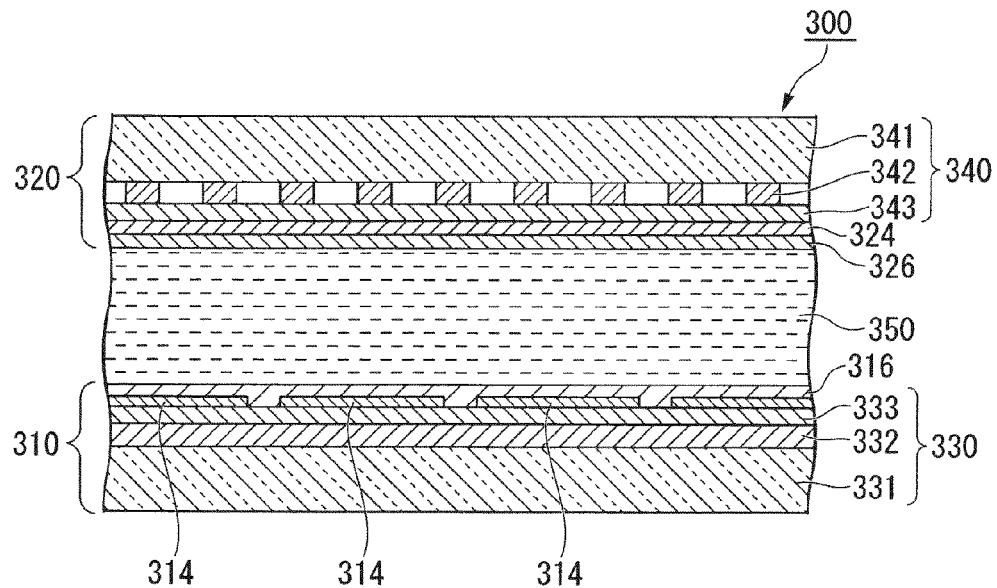
FIG. 19 is a schematic structural view illustrating an example of a liquid crystal device provided with the polarizing element of the embodiment.

FIG. 19 is a schematic sectional view showing an example of a liquid crystal device 300 including the polarizing element. The liquid crystal device 300 will be described as a third embodiment. The liquid crystal device 300 of the third embodiment is formed by providing a liquid crystal layer 350 between an element substrate 310 and a counter substrate 320.

The element substrate 310 and the counter substrate 320 include polarizing elements 330 and 340, respectively. The polarizing elements 330 and 340 are each the polarizing element of the second embodiment and have a structure in which metal thin wires provided with a protective film are formed on a substrate made of a light transmissive material such as glass, quartz, and plastic.

The polarizing element 330 includes a substrate main body 331, a metal thin wire 332, and a protective film 333 while the polarizing element 340 includes a substrate main body 341, a metal thin wire 342, and a protective film 343. In the embodiment, the substrate main bodies 331 and 341 serve as the substrate of each of the polarizing elements and also serve as the substrates of the liquid crystal device. The metal thin wires 332 and 342 are disposed in a manner intersecting with each other. In each of the polarizing elements 330 and 340, the metal thin wires are disposed at an inner surface side of the element (a side adjacent to the liquid crystal layer 350).

On the inner surface side of the polarizing element 330 are provided pixel electrodes 314, wiring lines (not-shown), TFT elements (not-shown), and an alignment film 316. Similarly, on the inner surface side of the polarizing element 340 are provided a common electrode 324, and an alignment film 326.

In the liquid crystal device thus structured, the substrate main bodies 331 and 341 serve as the substrates for the liquid crystal device and the substrate for the respective polarizing elements, so that the total number of components can be reduced. Accordingly, the liquid crystal device as a whole can be made thinner and thus a function of the liquid crystal device 300 can be improved. Furthermore, since the device structure is simplified, the production of the liquid crystal device can be facilitated and cost reduction can be promoted.

While the polarizing element of the second embodiment is used in the liquid crystal device of the third embodiment, the polarizing element of the first embodiment, which element does not include a protective film, can also be used. In this case, protective layers are provided at the positions of the protective films 333 and 343 to protect each polarizing element.

Electronic Apparatus

Figure 20:
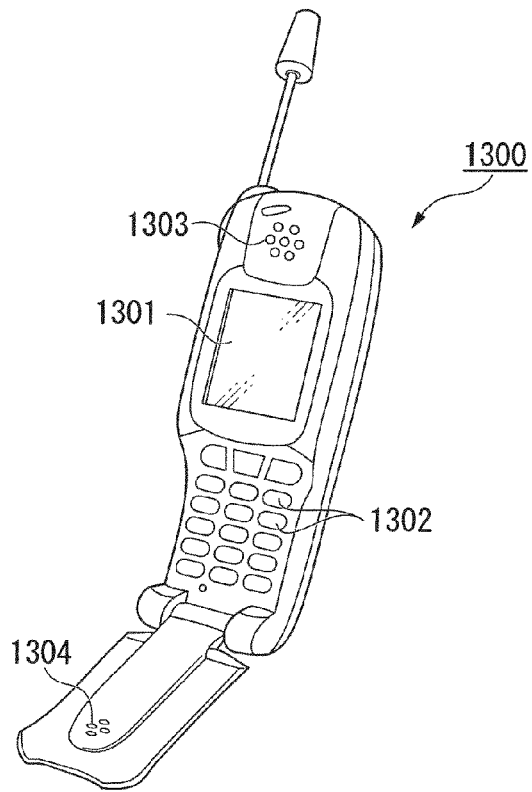
FIG. 20 is a perspective view of a cell-phone, which is an example of an electronic apparatus.

Next, a description will be given of an electronic apparatus according to a fourth embodiment. FIG. 20 is a perspective view showing an example of the electronic apparatus including the liquid crystal device of FIG. 19. A cell-phone (an electronic apparatus) 1300 shown in FIG. 20 includes the liquid crystal device as a small display section 1301, a plurality of operation buttons 1302, an earpiece 1303, and a mouthpiece 1304. Thereby, the cell-phone 1300 can be made highly reliable and can have a display section allowing for high-quality display.

Furthermore, besides the cell-phone, the liquid crystal device can be suitably used as an image display unit for electronic books, personal computers, digital still cameras, liquid crystal televisions, view finder type or direct view type video tape recorders, car navigation devices, pagers, electronic organizers, electronic calculators, word processors, work stations, TV phones, point-of-sale (POS) terminals, apparatuses with a touch panel, and the like.

The exemplary embodiments have been described with reference to the accompanied drawings. It should be clear, however, that the claims are not restricted to the embodiments. The shapes of the constituent members and the combination of the members shown in the embodiments are merely examples, and various modifications and changes can be made based on design requirements or the like without departing from the scope of the invention.

EXAMPLES

Examples of the invention will now be described below. The following examples show an evaluation based on simulation analysis to confirm the effects of the invention.

The evaluation is also based on an assumption that the polarizing element is used as a polarizing element for a light valve of a liquid crystal projector. The polarizing element has high thermal resistance since it is made of an inorganic material, and can preferably be applied to a pre-polarizing plate of a liquid crystal projector including a high power output light source.

Such a pre-polarizing plate needs to have a high optical transmittance with respect to TM light (Transverse Magnetic) and to well transmit the TM light. On the other hand, the pre-polarizing plate does not need to have a high optical absorptance with respect to TE light (Transverse Electric) since two polarizing elements work together to absorb the TE light as described above. Specifically, the following ranges are acceptable in practice: the optical transmittance with respect to TM light is greater than 90%; and the optical absorptance with respect to TE light is greater than 40%. The optical absorptance with respect to TE light is preferably more than 50% in order to reduce a load of the second polarizing element. In addition, in order to prevent TE light from being reflected by the pre-polarizing plate to be returned to the light valve, the reflectivity with respect to TE light is preferably at a low rate, and it is desirable that the rate is equal to or less than 20%.

Because of above reasons, the evaluation was conducted with the following conditions: the optical transmittance with respect to TM light is greater than 90%; the reflectivity with respect to TE light is equal to or lower than 20%; and the optical absorptance with respect to TE light is greater than 40%.

In the examples, the evaluation was conducted with a simulation analysis on a modeled polarizing element and an actual measurement on a specimen actually made.

The simulation analysis was conducted by using the GSolver grating analysis software tool commercially available from Grating Solver Development Company with parameters such as the shape and the refractive index of the modeled polarizing element.

Optical characteristics on the actual specimen were measured by using the spectrophotometer U-4100 manufactured by Hitachi High-Technologies Corporation.

Pre-Evaluation

First, two models were compared: one is a both-side model having metal thin wires on both side surfaces of a protruded thread, and the other one is a single-side model having the metal thin wire on only one side surface of the protruded thread. This evaluation step aims to conduct the analysis efficiently because the analysis on the both-side model takes a long time.

In the analysis, the dimensions of the protruded thread were set as follows: the height is 110 mm, and the width is 70 nm. The material to form the metal thin wire was set as molybdenum, and the refractive index and the extinction coefficient of molybdenum were used as the parameters. The dimensions of the metal thin wire were set as follows: the height is 28.8 nm, and the width is 18.3 nm for the both-side model while the height is 40.6 nm, and the width is 25.8 nm for the single-side model. In addition, the section areas of the metal wires of both models were set so as to be approximately equal to each other. That is, evaluation was conducted with a condition that the metal thin wires of both models had approximately the same volume.

Figure 21A:
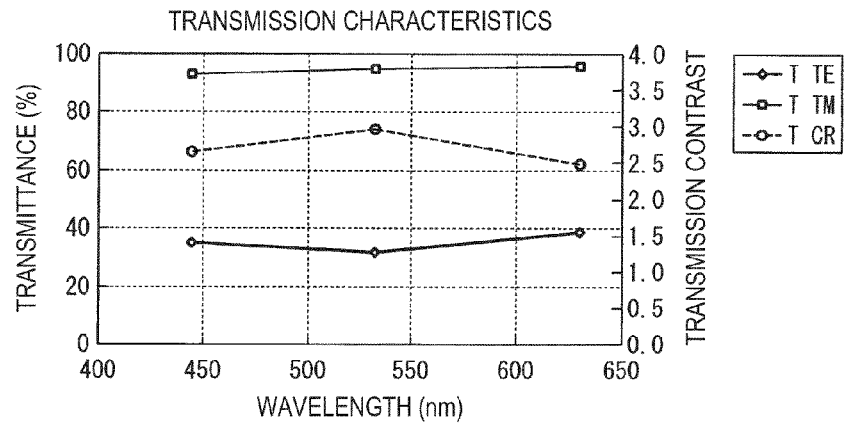
FIGS. 21A to 21C are explanatory views illustrating characteristics of the embodiments.
Figure 21B:
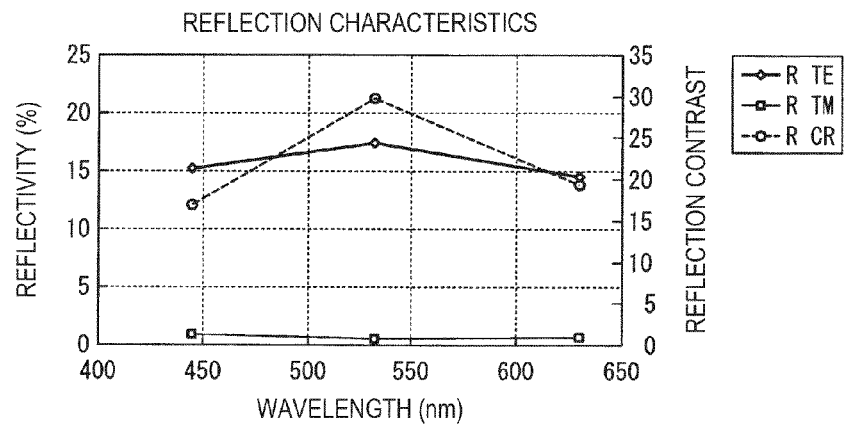
Figure 21C:
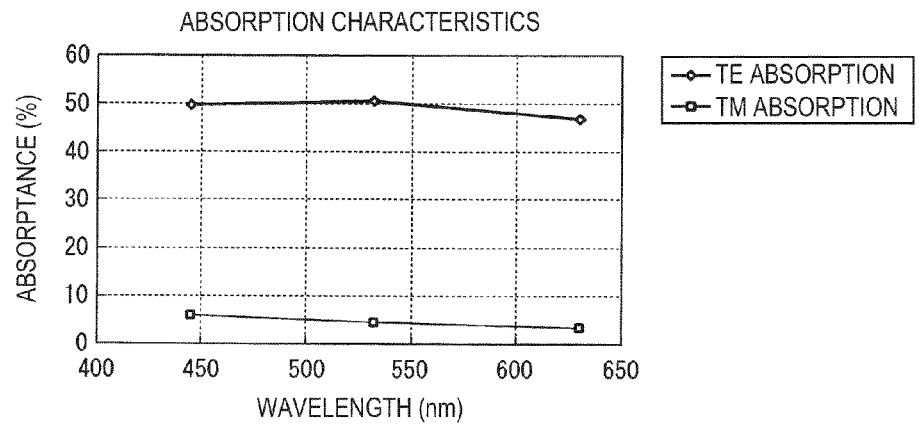
Figure 22A:
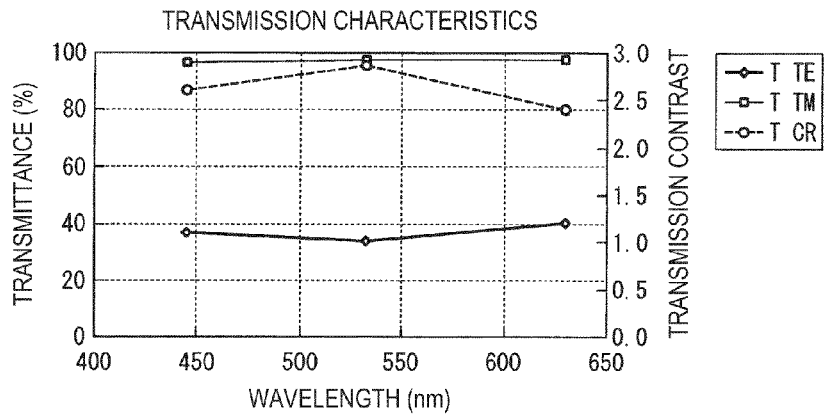
FIGS. 22A to 22C are explanatory views illustrating characteristics of the embodiments.
Figure 22B:
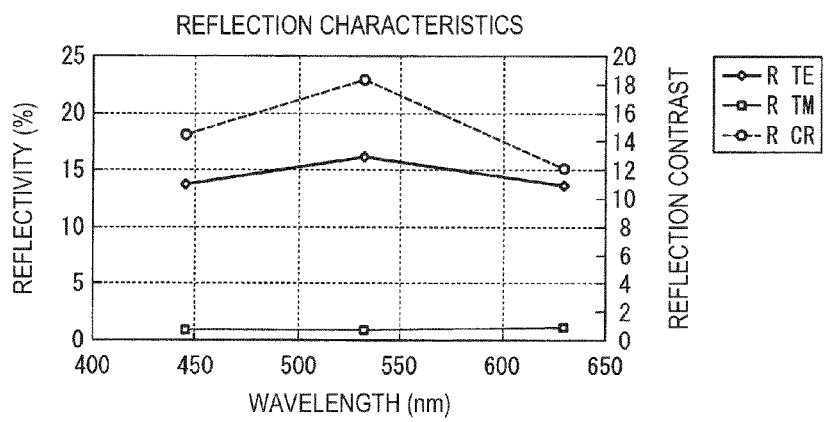
Figure 22C:
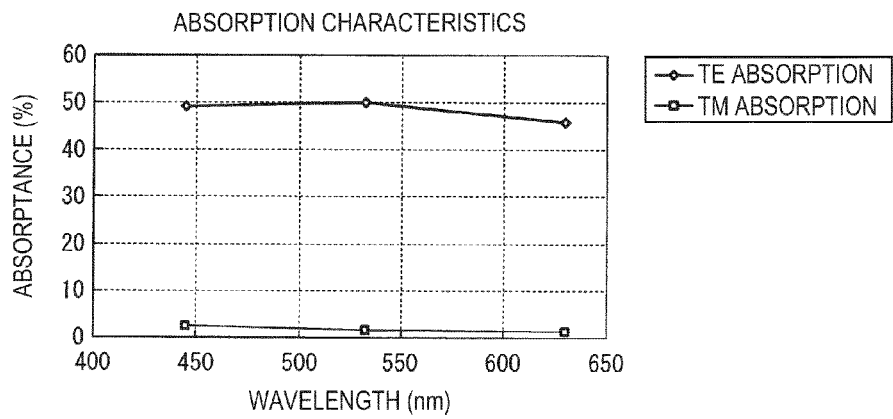

FIGS. 21A to 21C, and FIGS. 22A to 22C are graphs showing the simulation results of the optical transmittance, the reflectivity, and the optical absorptance with respect to TM light and TE light. In each figure, the abscissa axis shows the wavelength of light transmitted through the polarizing element while the ordinate axis shows the value of the optical characteristic. FIGS. 21A and 22A show optical transmission characteristics. FIGS. 21B and 22B show reflection characteristics. FIGS. 21C and 22C show optical absorption characteristics.

As a result of comparing the optical characteristics of both models with respect to TM light and TE light, both models behaved in the same manner. Accordingly, it was found that the optical characteristics of the both-side model were predictable by analyzing the single-side model.

In the succeeding simulation, the simulation analysis was conducted on the single-side model.

Confirmation on Material of Metal Thin Wire

Figure 23A:
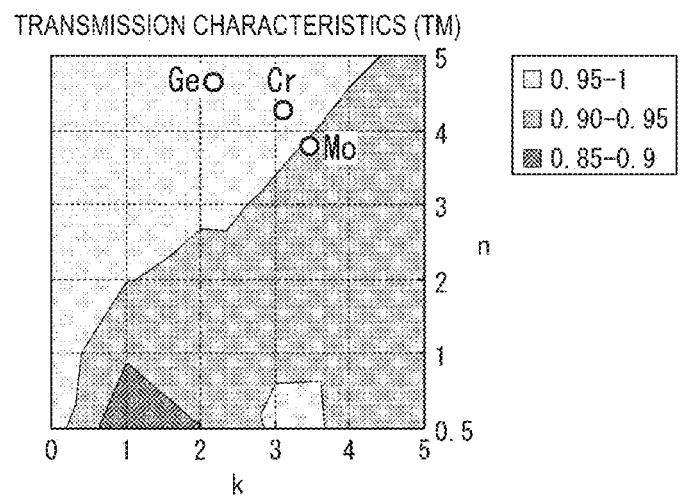
FIGS. 23A to 23C are explanatory views illustrating characteristics of the embodiments.
Figure 23B:
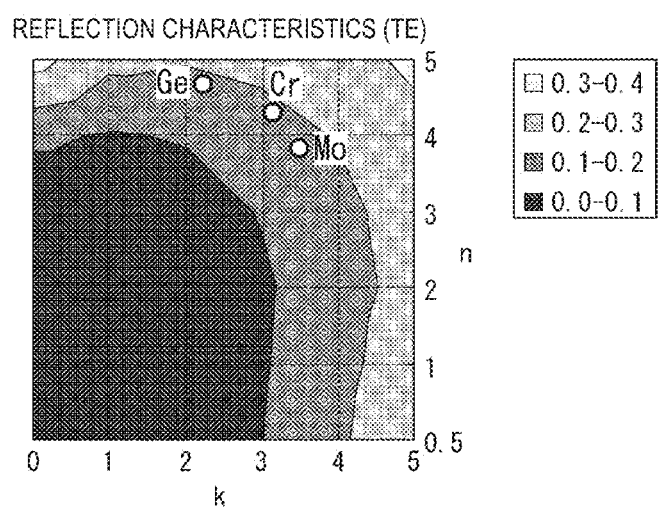
Figure 23C:
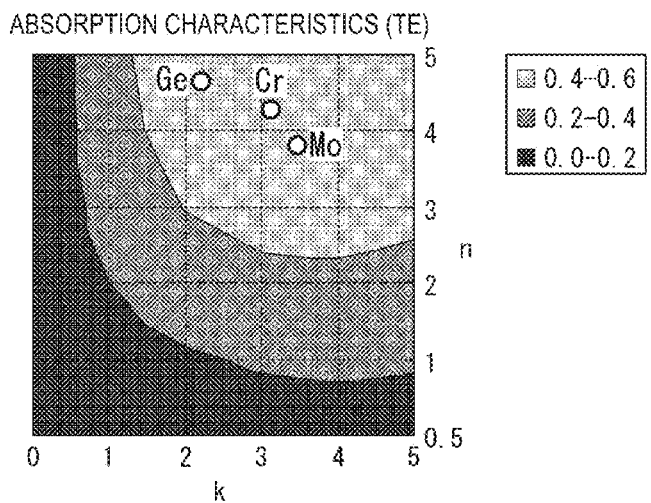

The influence of the material of the single-side model on the optical characteristics of the polarizing element was confirmed by varying the refractive index and the extinction coefficient of the metal material. FIGS. 23A to 23C show equal-value lines of each optical characteristic where the abscissa axis shows the extinction coefficient while the ordinate axis shows the refractive index. FIG. 23A shows the optical transmission characteristics with respect to TM light. FIG. 23B shows the reflection characteristics with respect to TE light. FIG. 23C shows the optical absorption characteristics with respect to TE light. The figures show the results where the refractive index was varied from 0.5 to 5 while the distinction coefficient was varied from 0 to 5. The values of the heights and widths of the protruded thread and the metal thin wire are the same as those used in the simulation shown in FIGS. 22A to 22C. The influence was verified with respect to light having a wavelength of 532 nm.

From the evaluation results, it was found that the optical characteristics of the optical transmission characteristics with respect to TM light, the reflection characteristics with respect to TE light, and the optical absorption characteristics with respect to TE light approximately showed the desired optical characteristics described above where the refractive index n was from 3 to 5 inclusive, and the distinction coefficient was from 2 to 5 inclusive. Since the evaluation results are derived from the properties of the material of the metal thin wire, it can be analogized that the polarizing element, which has a shape of the both-side mode, shows the same tendency.

The materials having refractive indexes and distinction coefficients of such ranges include germanium, chromium, and molybdenum. These metal materials are shown in the figures.

Confirmation on the Height of the Protruded Thread

The influence on the optical characteristics by changing the height of the protruded thread was confirmed with the single-side model. The simulation results are shown in FIG. 24A to 24C with respect to light having a wavelength of 532 nm where the width of the protruded thread was 70 nm, the width of the metal thin wire was 19.25 nm, and germanium was chosen as the metal material.

Figure 24A:
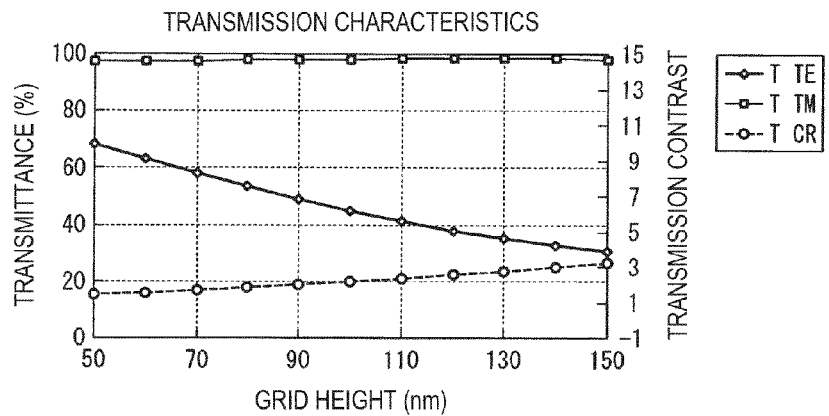
FIGS. 24A to 24C are explanatory views illustrating characteristics of the embodiments.
Figure 24B:
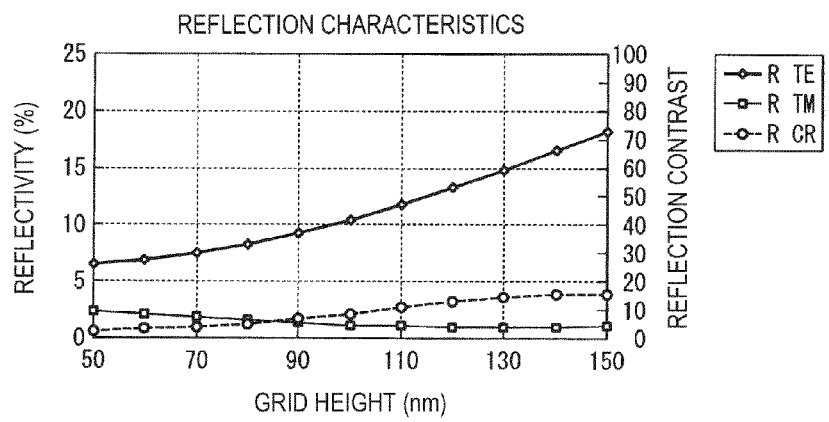
Figure 24C:
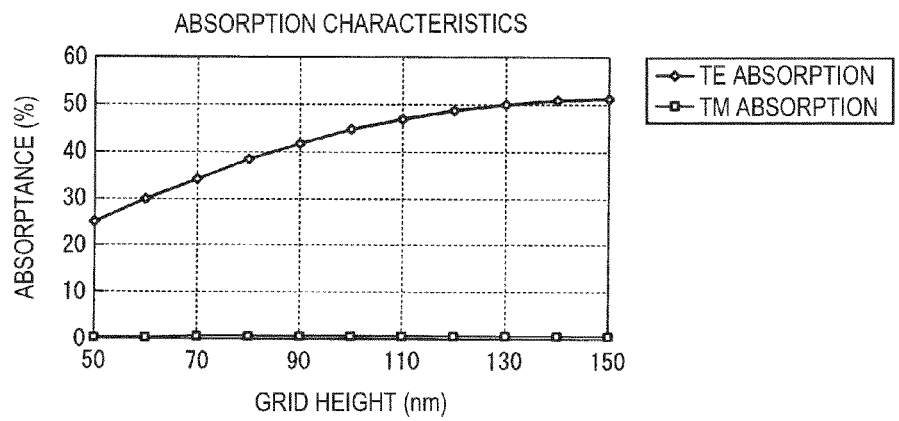
Figure 25:
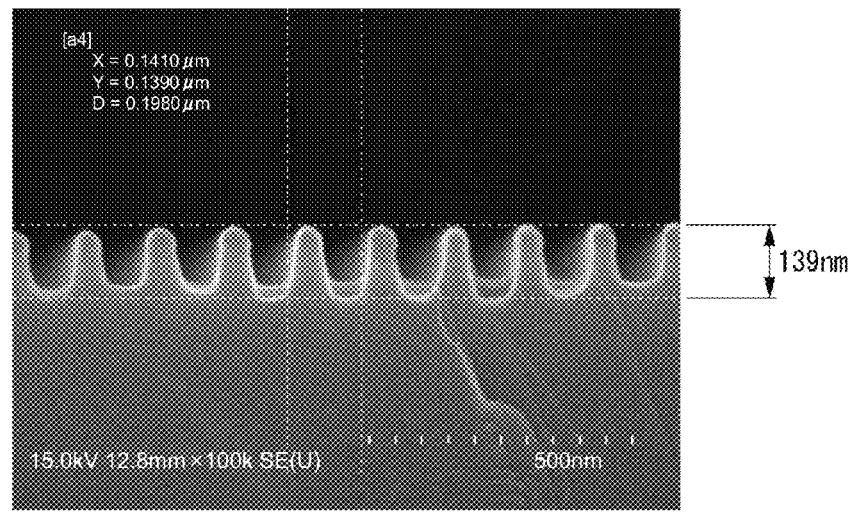
FIG. 25 is an explanatory view illustrating characteristics of the embodiments.
Figure 26A:
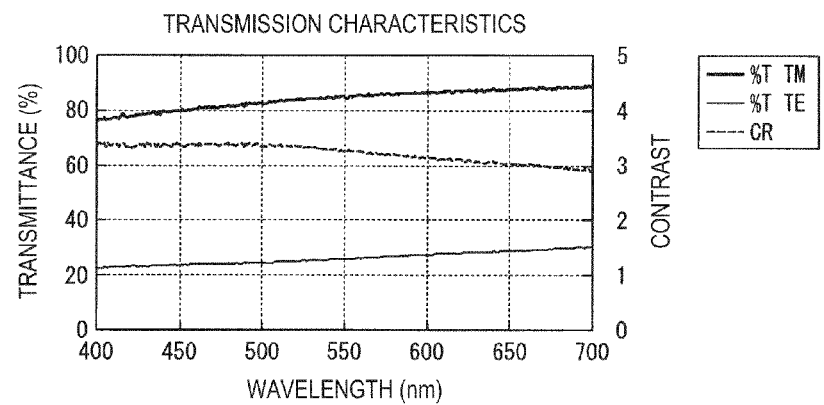
FIGS. 26A to 26C are explanatory views illustrating characteristics of the embodiments.
Figure 26B:
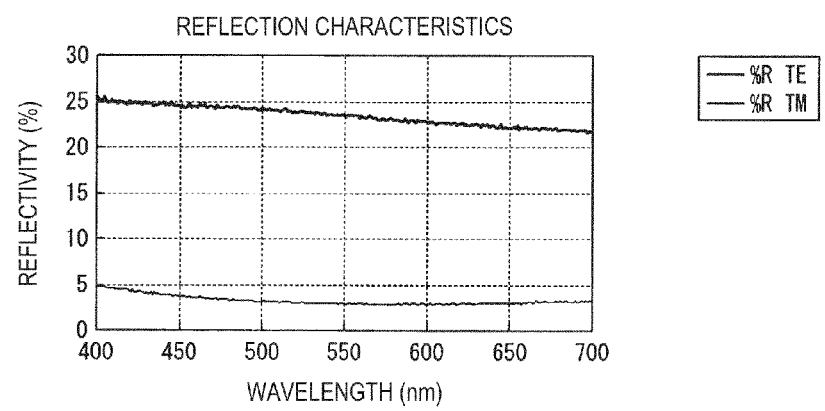
Figure 26C:
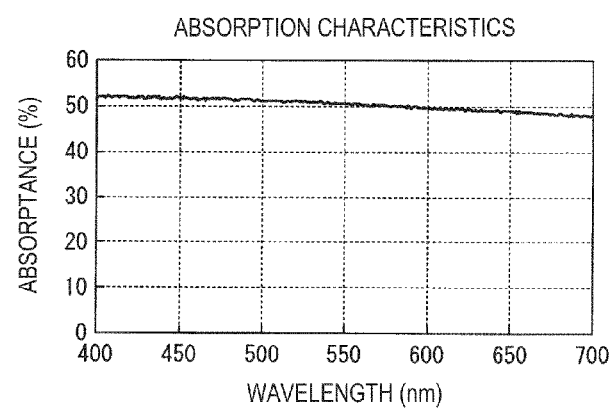
Figure 27:
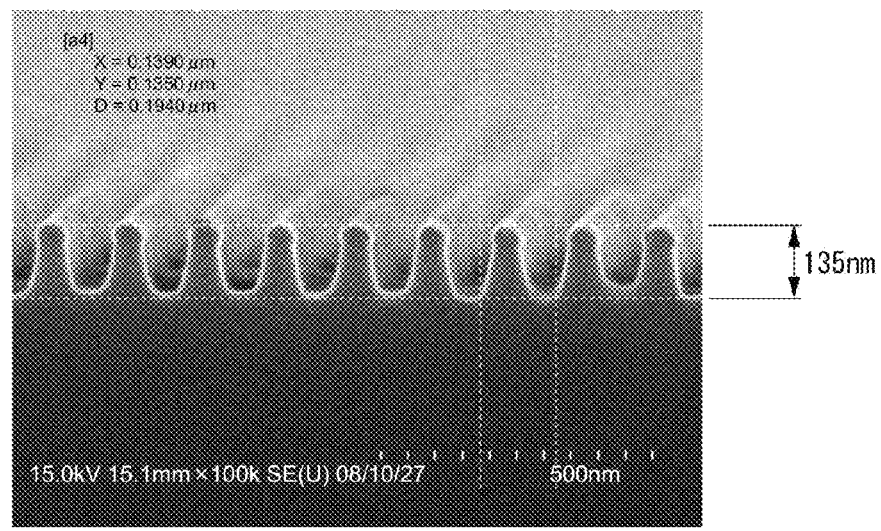
FIG. 27 is an explanatory view illustrating characteristics of the embodiments.
Figure 28A:
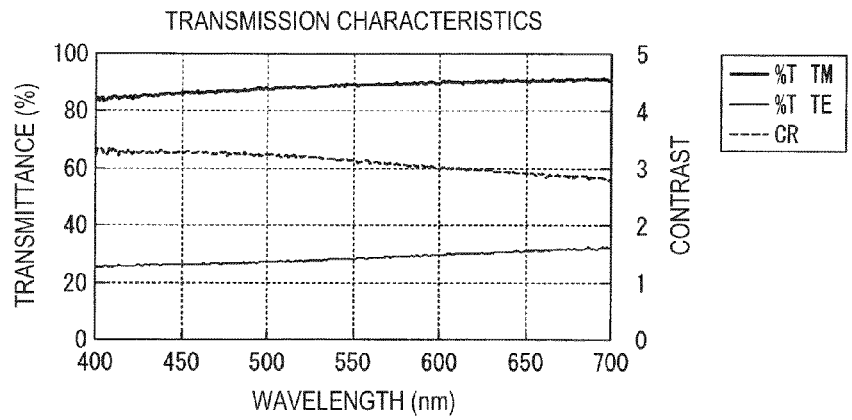
FIGS. 28A to 28C are explanatory views illustrating characteristics of the embodiments.
Figure 28B:
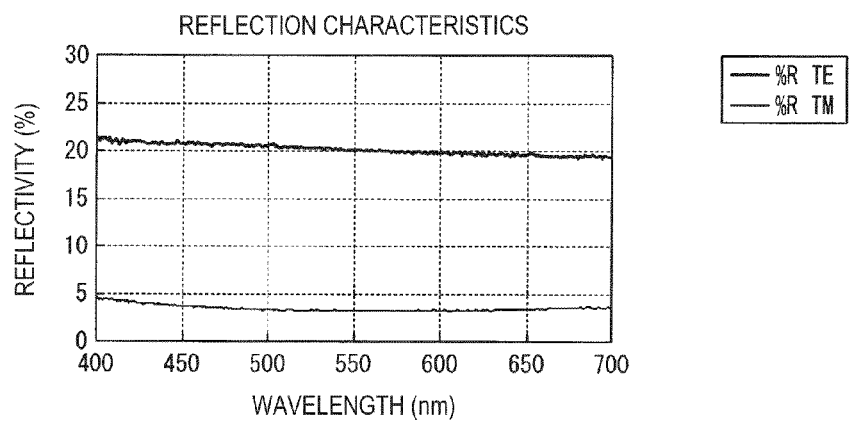
Figure 28C:
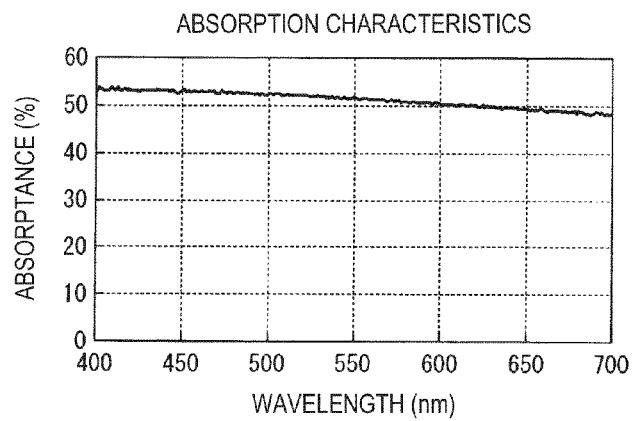
Figure 29:
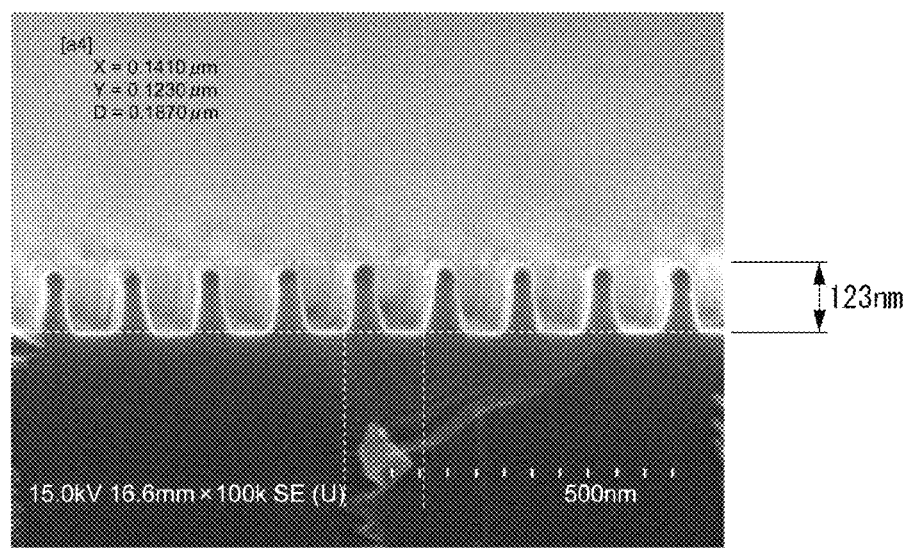
FIG. 29 is an explanatory view illustrating characteristics of the embodiments.
Figure 30A:
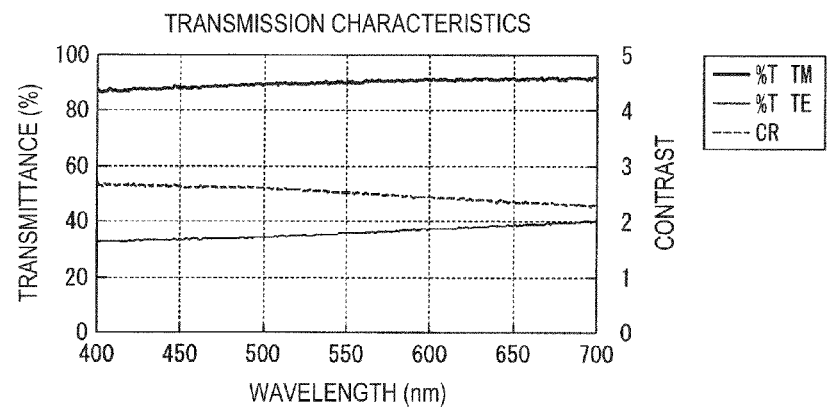
FIGS. 30A to 30C are explanatory views illustrating characteristics of the embodiments.
Figure 30B:
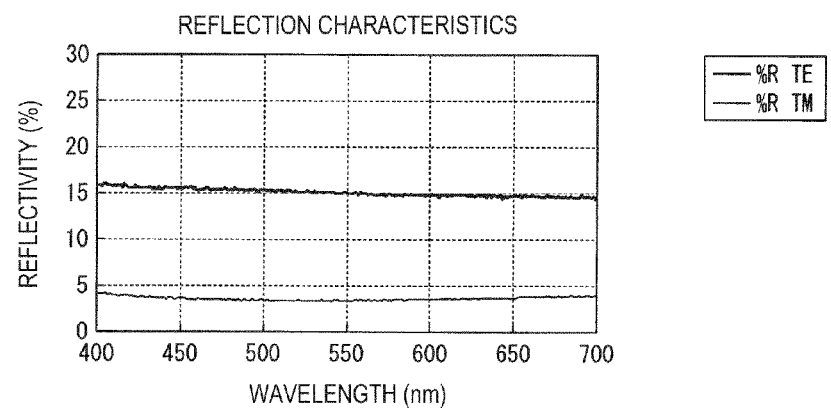
Figure 30C:
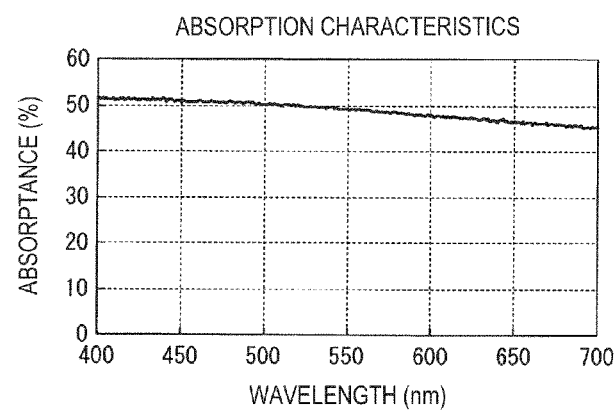
Figure 31:
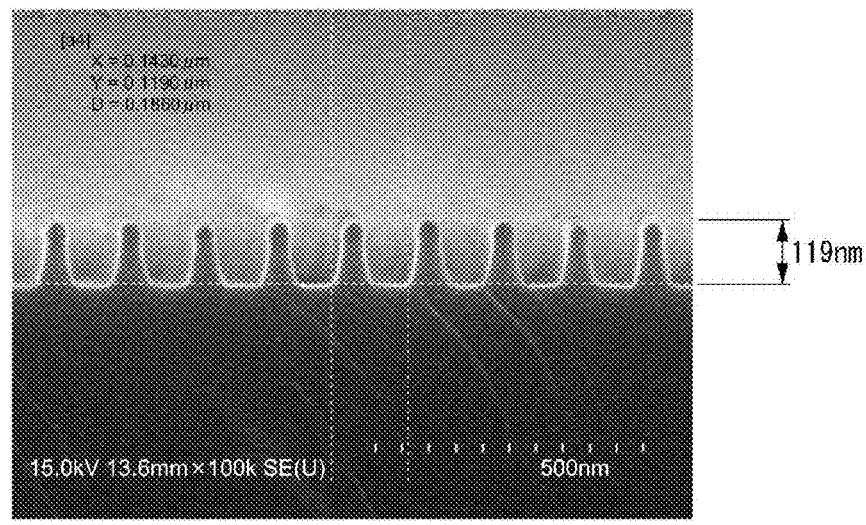
FIG. 31 is an explanatory view illustrating characteristics of the embodiments.
Figure 32A:
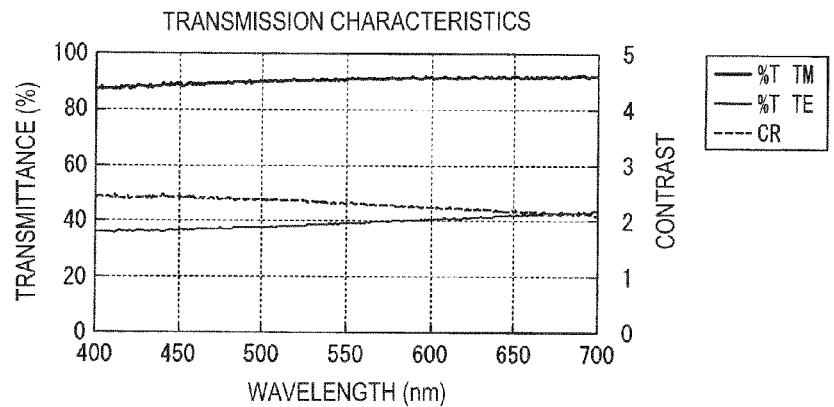
FIGS. 32A to 32C are explanatory views illustrating characteristics of the embodiments.
Figure 32B:
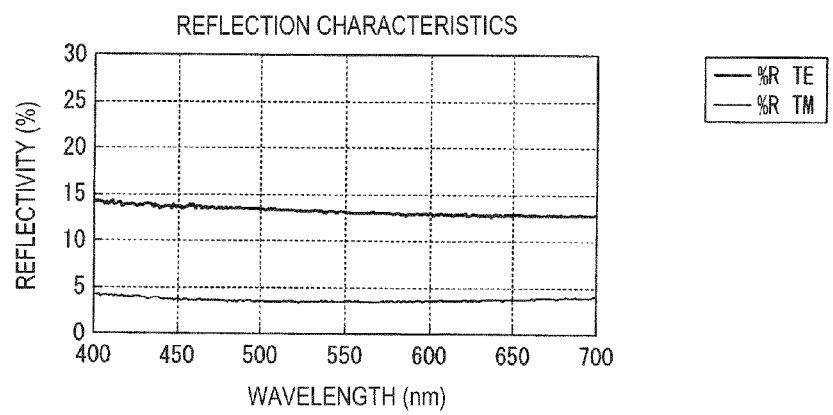
Figure 32C:
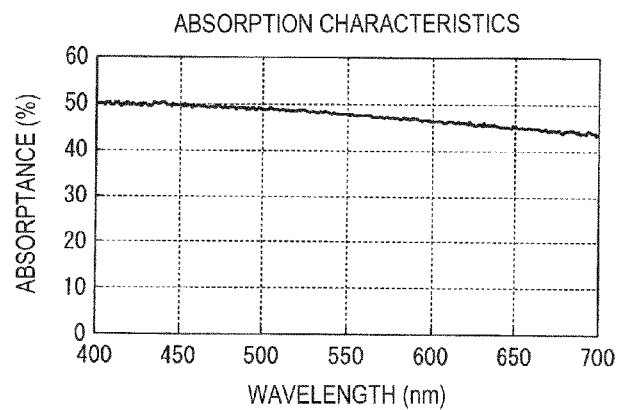

FIGS. 24A to 24C are graphs showing the simulation results of characteristics of the optical transmittance, the reflectivity, and the optical absorption characteristics with respect to TM light and TE light. In each figure, the abscissa axis shows the height (grid height) of the protruded thread of the polarizing element while the ordinate axis shows the value of the optical characteristic. FIG. 24A shows optical transmission characteristics. FIG. 24B shows reflection characteristics. FIG. 24C shows optical absorption characteristics. The figures show the results where the grid height was changed from 50 nm to 150 nm.

In a case where the protruded thread is practically formed, a resist pattern is formed on a substrate and thereafter the substrate is etched as described above. Because of this step, the maximum of the grid height of the protruded thread is practically determined by the resist pattern thickness and a selection ratio in the etching process. In the example, the simulation was conducted where the maximum grid height was set to be 150 nm as an upper limit. The maximum grid height, 150 nm, is an empirical value when a dry-etching was conducted by using a resist having a thickness of 200 nm with the etching conditions described above.

The evaluation results showed that as the grid height increased the higher the reflectivity and the optical absorptance with respect to TE light. It was found that the optical characteristics with respect to TE light were strongly influenced by the grid height. In a case where the polarizing element is used as one of the absorption type described above, the grid height needs to be equal to or higher than 90 nm so as to satisfy that the absorptance with respect to TE light is equal to or greater than 40%. In addition, it was found that the grid height was preferably equal to or higher than 130 nm since the absorptance with respect to TE light was saturated at approximately 50% if the grid height was equal to or higher than 130 nm.

While the evaluation results are the simulation results on the single-side model, it can be analogized that the polarizing element, which has a shape of the both-side mode, shows the same tendency because the both-side model also shows the same tendency as described above.

Confirmation on Film-Forming Amount of Metal Thin Wire

The influence on the optical characteristics was confirmed by changing the thickness of the metal thin wire (a film-forming amount) where the height of the protruded thread was set to be constant. In the example, the protruded threads, each having a width of 70 nm and a height of 115 nm, were provided on a SiO$_2$ substrate at a pitch of 70 nm. The specimen was made using molybdenum as the metal material and the optical characteristics were measured. A total height from the lower end of the protruded thread to the top end of the metal thin wire was determined from SEM photographs of the sections of the protruded thread and the metal thin wire. The thickness of the metal thin wire was determined by subtracting the height of the protruded thread, i.e., 115 nm, from the total height.

FIGS. 25 to 32C show the optical characteristics where the metal thin wires were formed on the protruded threads having a constant height with different film-forming amounts. FIG. 25 and FIGS. 26A to 26C show the results where the film-forming amount was 24 nm. FIG. 27 and FIGS. 28A to 28C show the results where the film-forming amount was 28 nm. FIG. 29 and FIGS. 30A to 30C show the results where the film-forming amount was 8 nm. FIG. 31 and FIGS. 32A to 32C show the results where the film-forming amount was 4 nm. FIGS. 25, 27, 29, and 31 show the section SEM photographs. In each of FIGS. 26A to 26C, FIGS. 28A to 28C, FIGS. 30A to 30C, and FIGS. 32A to 32C, the abscissa axis and the ordinate axis show the same as those in FIGS. 21A to 22C. FIGS. 26A, 28A, 30A, and 32A show the optical transmission characteristics. FIGS. 26B, 28B, 30B, and 32B show the reflection characteristics. FIGS. 26C, 28C, 30C, and 32C show the optical absorption characteristics.

The evaluation results showed that as the film-forming amount decreased the optical transmittance with respect to TM light tended to increase, the reflectivity with respect to TE light tended to decrease, and the optical absorptance with respect to TE light tended to decrease. The comparison of the optical characteristics where the wavelength is 530 nm is shown in the following Table 1.

TABLE 1

|  |  | Film-forming Amount | | | |
| --- | --- | --- | --- | --- | --- |
|  |  | 24 nm | 20 nm | 8 nm | 4 nm |
| TM light | Transmittance (%) | 84 | 89 | 90 | 91 |
| TE light | Reflectivity (%) | 24 | 20 | 15 | 13 |
|  | Absorptance (%) | 51 | 52 | 50 | 48 |

From the results, it was found that the polarizing element of the example showed appropriate optical characteristics of the optical transmittance with respect to TM light, and the reflectivity and the optical absorptance with respect to TE light where the film-forming amount was 8 nm.

From the results described above, it was confirmed that the polarizing element had appropriate optical characteristics and the structure was effective for solving the problems.

What is claimed is:
1. A polarizing element, comprising:
a substrate;
a plurality of protruded threads on one surface of the substrate, the plurality of protruded threads extending substantially parallel to one another in a first direction, each of the plurality of protruded threads having first and second side surfaces projecting from the one surface of the substrate to an upper end part of the protruded thread; and
a plurality of metal thin wires respectively provided to the plurality of protruded threads and extending in the first direction, each of the plurality of metal thin wires including a first thin wire and a second thin wire, the first thin wire being provided to the first side surface of the protruded thread, the second thin wire being provided to the second side surface of the protruded thread, the first and the second thin wires being overlapped with one another at the upper end part of the protruded thread,
wherein each first thin wire has a first volume, each second thin wire has a second volume, and each metal thin wire has a third volume which is the sum of the first and second volumes, and
wherein the first volume is continuously decreased as a distance from one end of the substrate increases, the second volume is continuously increased as the distance from the one end of the substrate increases, and the third volume is maintained within a predetermined range.

2. The polarizing element according to claim 1, wherein the predetermined range is ±4% from an average of the third volumes.

3. The polarizing element according to claim 1, wherein the first volume is linearly decreased as the distance from the one end of the substrate increases, and the second volume is linearly increased as the distance from the one end of the substrate increases.

4. The polarizing element according to claim 1 further comprising:
a protective film covering the protruded threads and the metal thin wires,
wherein a gap devoid of the protective film is formed in a region between adjacent protruded threads.

5. The polarizing element according to claim 4, wherein the protective film entirely surrounds the gap.

6. The polarizing element according to claim 4, wherein the protective film comprises an insulation material having a light transmissive property.

7. The polarizing element according to claim 1, wherein the metal thin wires comprise a material selected from silicon, germanium, chromium, and molybdenum.

8. A method for manufacturing a polarizing element, comprising:
providing a substrate, the substrate having a plurality of protruded threads on one surface of the substrate, the plurality of protruded threads extending substantially parallel to one another in a first direction, each of the plurality of protruded threads having first and second side surfaces projecting from the one surface of the substrate to an upper end part of the protruded thread;
depositing a metal material on the plurality of protruded threads from a direction slanting with respect to the one surface so as to form a plurality of metal thin wires on the protruded threads,
wherein the step of depositing further includes:
depositing the metal material on the first side surface of each of the protruded threads from a second direction intersecting the first direction of the protruded threads so as to form a plurality of first thin wires, and
depositing the metal material on the second side surface of each of the protruded threads from a third direction so as to form a plurality of second thin wires, the first and second thin wires forming each of the metal thin wires, and
wherein an azimuth direction of the third direction is opposite to an azimuth direction of the second direction if the second and the third directions are projected on the one surface of the substrate;
each first thin wire has a first volume, each second thin wire has a second volume, and each metal thin wire has a third volume which is the sum of the first and second volumes; and
the first volume is continuously decreased as a distance from one end of the substrate increases, the second volume is continuously increased as the distance from the one end of the substrate increases, and the third volume is maintained within a predetermined range.

9. The method for manufacturing a polarizing element according to claim 8, further comprising:
forming a protective film covering the metal thin wires,
wherein, in the step of forming the protective film, a gap devoid of the protective film is formed in a region between adjacent protruded threads by a CVD method.

10. A projection type display, comprising:
a lighting optical system emitting light;
a liquid crystal light valve modulating the light;
the polarizing element according to claim 1 on which the modulated light is incident; and
a projection optical system projecting on a projection surface polarized light passed through the polarizing element.

11. A liquid crystal device, comprising:
a liquid crystal layer;
a pair of substrates between which the liquid crystal layer is sandwiched, wherein the polarizing element according to claim 1 is formed at a side adjacent to the liquid crystal layer of at least one of the pair of substrates.

12. An electronic apparatus comprising the liquid crystal device according to claim 11.

13. A polarizing element, comprising:
a substrate having a plurality of protruded threads on one surface thereof, the plurality of protruded threads extending substantially parallel to one another in a first direction; and
a plurality of metal thin wires respectively provided on the plurality of protruded threads, each of the plurality of metal thin wires extending in the first direction and including a first thin wire and a second thin wire, the first thin wire being provided on a first side surface of the protruded thread, the second thin wire being provided on a second side surface of the protruded thread,
wherein, as a distance from one end of the substrate increases, a first volume of each first thin wire decreases and a second volume of each second thin wire increases, the distance being transverse to the first direction.

14. The polarizing element according to claim 13, wherein the first and second thin wires overlap each other at an upper end part of the protruded thread, the upper end part being spaced apart from the one surface of the substrate by the first and second side surfaces of the protruded thread.

15. The polarizing element according to claim 13, wherein each metal thin wire has a third volume which is the sum of the first and second volumes and, as the distance from the one end of the substrate increases, the third volume is maintained within a predetermined range.

16. The polarizing element according to claim 15, wherein the predetermined range is ±4% from an average of the third volumes.

17. The polarizing element according to claim 13 further comprising:
a protective film covering the protruded threads and the metal thin wires,
wherein a gap devoid of the protective film is formed in a region between adjacent protruded threads.

* * * * *